United States Patent
Sevak et al.

(10) Patent No.: US 11,237,272 B2
(45) Date of Patent: Feb. 1, 2022

(54) METHOD AND COMPUTER PROCESSING APPARATUS FOR GENERATING DATA RELATING TO A VERTICAL STRUCTURE OF A BUILT ENVIRONMENT AND DETECTING A FLOOR CHANGE

(71) Applicant: HUAWEI TECHNOLOGIES CO., LTD., Shenzhen (CN)

(72) Inventors: Zankar Upendrakumar Sevak, Edinburgh (GB); Firas Alsehly, Edinburgh (GB); Ivo Dimitrov, Edinburgh (GB)

(73) Assignee: HUAWEI TECHNOLOGIES. CO., LTD., Shenzhen (CN)

( * ) Notice: Subject to any disclaimer, the term of this patent is extended or adjusted under 35 U.S.C. 154(b) by 209 days.

(21) Appl. No.: 16/478,560

(22) PCT Filed: Jan. 17, 2018

(86) PCT No.: PCT/GB2018/050131
§ 371 (c)(1),
(2) Date: Jul. 17, 2019

(87) PCT Pub. No.: WO2018/134586
PCT Pub. Date: Jul. 26, 2018

(65) Prior Publication Data
US 2020/0049832 A1    Feb. 13, 2020

(30) Foreign Application Priority Data
Jan. 17, 2017   (GB) ...................................... 1700816

(51) Int. Cl.
*G01S 19/14*   (2010.01)
*G01C 5/06*   (2006.01)
*G01S 19/39*   (2010.01)

(52) U.S. Cl.
CPC ................ *G01S 19/14* (2013.01); *G01C 5/06* (2013.01); *G01S 19/39* (2013.01)

(58) Field of Classification Search
CPC . G01C 5/06; G01S 19/14; G01S 19/39; G01S 7/4915

(Continued)

(56) References Cited

U.S. PATENT DOCUMENTS 7,991,405 B2 *  8/2011   Zhao ..................... H04W 64/00
                                                  455/456.1
2013/0297198 A1   11/2013  Vande Velde et al.

(Continued)

FOREIGN PATENT DOCUMENTS

| JP | 2016-148519 | 8/2016 |
| JP | 2016148519 A | 8/2016 |

OTHER PUBLICATIONS

International Search Report dated May 11, 2018 issued in International Application No. PCT/GB2018/050131 (3 pgs.).

(Continued)

*Primary Examiner* — Aditya S Bhat
(74) *Attorney, Agent, or Firm* — Nixon & Vanderhye PC

(57) ABSTRACT

The invention provides a method of generating data relating to a vertical structure (20) of a built environment comprising a plurality of floors (24, 26, 28), the method comprising: receiving altitude change data representing changes in altitude within the built environment of a plurality of mobile devices (1a, 1b, 1c, 1d) or from which changes in altitude of a plurality of mobile devices within a built environment comprising a plurality of floors can be determined; determining a parameter relating to an estimated storey height of the building from received said altitude change data; and processing received said altitude change data and the said parameter relating to the estimated storey height to thereby (Continued)

generate data relating to the vertical structure of the multi-storey building.

19 Claims, 7 Drawing Sheets

(58) Field of Classification Search
USPC .......................................................... 702/150
See application file for complete search history.

(56) References Cited

U.S. PATENT DOCUMENTS

| | | |
|---|---|---|
| 2014/0323160 A1 | 10/2014 | Venkatraman et al. |
| 2014/0324381 A1 | 10/2014 | Venkatraman et al. |
| 2015/0006100 A1* | 1/2015 | Jackson .................... G01C 5/06 702/94 |
| 2016/0102995 A1* | 4/2016 | Gum .......................... G01C 5/06 702/98 |
| 2016/0161252 A1 | 6/2016 | Yasui |
| 2016/0234645 A1* | 8/2016 | Belghoul .................. G01C 5/06 |
| 2017/0276760 A1* | 9/2017 | Alsehly .................. G01S 5/0236 |
| 2020/0260406 A1* | 8/2020 | Pattabiraman ...... H04W 64/003 |

OTHER PUBLICATIONS

Search Report for GB Application No. 1700816.0 dated Jun. 29, 2017, 9 pages.
International Search Report for PCT/GB2018/050131 dated May 11, 2018, 5 pages.
Written Opinion of the ISA for PCT/GB2018/050131 dated May 11, 2018, 27 pages.

* cited by examiner

| Ground floor | First floor | Second floor | Third floor | Fourth floor |
|---|---|---|---|---|
| Altitude change from ground floor: 0m | Altitude change from ground floor: 3.5m | Altitude change from ground floor: 7m | Altitude change from ground floor: 10.5m | Altitude change from ground floor: 14m |

Fig. 5

| Ground floor | First floor | Second floor | Third floor | Fourth floor |
|---|---|---|---|---|
| ID_G1, RSS_1, Confidence_G1 | ID_11, RSS_1, Confidence_1 | ID_21, RSS_21, Confidence_21 | ID_31, RSS_31, Confidence_31 | ID_41, RSS_41, Confidence_41 |
| ID_G2, RSS_2, Confidence_G2 | ID_12, RSS_12, Confidence_12 | ID_22, RSS_22, Confidence_22 | ID_32, RSS_32, Confidence_32 | ID_42, RSS_42, Confidence_42 |
| ID_Gn, RSS_Gn, Confidence_Gn | ID_1n, RSS_1n, Confidence_1n | ID_2n, RSS_2n, Confidence_2n | ID_3n, RSS_3n, Confidence_3n | ID_4n, RSS_4n, Confidence_4n |

Fig. 6

METHOD AND COMPUTER PROCESSING APPARATUS FOR GENERATING DATA RELATING TO A VERTICAL STRUCTURE OF A BUILT ENVIRONMENT AND DETECTING A FLOOR CHANGE

CROSS-REFERENCE TO RELATED APPLICATIONS

This application is the U.S. national phase of International Application No. PCT/GB2018/050131 filed Jan. 17, 2018 which designated the U.S. and claims priority to GB 1700816.0 filed Jan. 17, 2017, the entire contents of each of which are hereby incorporated by reference.

FIELD OF THE INVENTION

The invention relates to a method of generating data relating to a vertical structure of a built environment comprising a plurality of floors; computer processing apparatus; a method of detecting a floor change of a mobile device within a built environment comprising a plurality of floors; and a mobile device.

BACKGROUND TO THE INVENTION

Mobile telecommunications devices such as smartphones need to determine their locations in order to provide location services to users. Whilst such devices now commonly have Global Navigation Satellite System (GNSS) position sensors (e.g. GPS (Global Positioning System) position sensors), it is often not possible for a mobile device to obtain direct lines of sight with enough GNSS satellites for those systems to be usable, particularly when the mobile device is located indoors.

It is possible to estimate a two dimensional (longitude/latitude) location of a mobile telecommunications device indoors by detecting electromagnetic signals from terrestrial electromagnetic signal sources of known two dimensional location (longitude and latitude) and estimating the location of the mobile device from the detected electromagnetic signals using either triangulation or stored fingerprint data specifying the expected variation of received signal strength from the said electromagnetic signal sources with distance from the signal source.

Determining the altitude of the mobile device within a multi-storey building can be more difficult, particularly when there is no pre-existing data describing the vertical structure of the building. One way to determine altitude is to use an air pressure sensor such as a barometer or altimeter and indeed mobile telecommunications devices are now commonly fitted with such devices. However, converting air pressure measurements to absolute altitude is highly error prone due to changes in environmental parameters (such as temperature, which affects atmospheric pressure) affecting the conversion. In addition, raw altitude data, however accurate, may not be of much use to a user of a mobile device, particularly indoors.

There are systems which allow the altitude of a mobile device to be estimated by triangulation of detected electromagnetic signals using prior known ground truth locations of the Wi-Fi, RF or Bluetooth beacons or LTE base stations transmitting the said electromagnetic signals. There are also systems which rely on radio maps obtained by prior prescribed manual surveys to collect electromagnetic signal fingerprints in known ground truth co-ordinates. In this case, the altitude of a mobile device can be estimated by comparing electromagnetic signals received by the said mobile device with the radio map. However, these systems require prescribed surveys to have been performed, or prior knowledge of the infrastructure of the building, which can be expensive and time consuming to obtain.

New methods of determining the vertical position of a mobile device and of generating data relating to a vertical structure of a multi-storey building are therefore required.

SUMMARY OF THE INVENTION

A first aspect of the invention provides a method of generating data relating to (e.g. representing) a vertical structure (e.g. a vertical arrangement of floors) of a (typically indoor) built environment comprising a plurality of (typically vertically arranged) floors (i.e. a plurality of storeys). The method typically comprises: receiving (e.g. crowdsourcing) altitude change data representing changes in altitude (typically including changes in altitude between different pairs of floors) within the built environment of a plurality of mobile devices (typically handheld or wearable mobile telecommunications devices) or from which changes in altitude within the built environment of a plurality of mobile devices can be determined (e.g. air pressure data measured by the said mobile devices relating to (e.g. during) altitude changes of the devices within the built environment). The method typically further comprises determining a parameter relating to an estimated storey height of the built environment from received said altitude change data. Typically the method further comprises processing received said altitude change data (which may or may not include the received altitude change data used to determine the parameter relating to the estimated storey height of the built environment) and (e.g. together with) the said determined parameter relating to the estimated storey height to thereby generate (e.g. create or update) data relating to the vertical structure (e.g. the vertical arrangement of floors) of the built environment.

A second aspect of the invention provides computer processing apparatus including a computer processor, the computer processing apparatus (typically the computer processor) being configured to perform the steps of a method comprising: receiving (e.g. crowdsourcing) altitude change data representing changes in altitude within a built environment comprising a plurality of (typically vertically arranged) floors of a plurality of mobile devices (typically handheld or wearable mobile telecommunications devices) or from which changes in altitude of a plurality of mobile devices within a built environment comprising a plurality of floors can be determined. The method typically further comprises determining a parameter relating to an estimated storey height of the built environment from received said altitude change data. The method typically further comprises processing received said altitude change data and (e.g. together with) the said determined parameter relating to the estimated storey height to thereby generate (e.g. create or update) data relating to (e.g. representing) the vertical structure (e.g. the vertical arrangement of floors) of the built environment.

By determining a parameter relating to an estimated storey height (the height of one storey, i.e. the altitude difference between vertically adjacent floors) of the built environment from received said altitude change data, and processing received said altitude change data and (e.g. together with) the said determined parameter relating to the estimated storey height of the built environment, data can be generated which represents the vertical structure of the built environment from crowd-sourced altitude change data without having specific prior knowledge of the structure or layout of the built environment or (for example) of the vertical locations of electromagnetic signal sources which would be detectable within the built environment. This generated data can be subsequently used to identify the respective floors of the built environment on which mobile devices are located. This information can be output to the users of the mobile devices, e.g. in respect of location services being provided to the said users, e.g. on respective user interfaces (e.g. displays) of the respective mobile devices.

The built environment may comprise or consist of a multi-storey building. The built environment may comprise a plurality of buildings which are connected to each other, one or more (or each) of the said buildings comprising a plurality of floors. The built environment may comprise a plurality of buildings which are adjacent to each other, for example, as part of a block of buildings in a metropolitan area. The built environment may comprise a plurality of interconnected buildings. The built environment may comprise a plurality of buildings having different numbers of floors from each other.

It may be that the method comprises dynamically updating the said parameter relating to the storey height of the built environment.

The determined parameter relating to the estimated storey height of the built environment may be, for example, an estimated storey height of the built environment or a determined parameter (e.g. an air pressure change relating to an estimated storey height of the built environment) from which the estimated storey height of the built environment can be determined.

Typically the said data relating to (e.g. representing) the vertical structure of the built environment is data which can be used to assist the determination of the floor of the built environment on which a mobile device is located.

It may be that the step of determining the said parameter relating to the estimated storey height of the built environment from received said altitude change data comprises determining the said parameter relating to the estimated storey height of the built environment from a (typically statistical) distribution of received said altitude change data. It may be that the method comprises determining a (typically statistical) distribution of received said altitude change data and determining the said parameter relating to the estimated storey height of the built environment from the said distribution.

It may be that the step of determining the said parameter relating to the estimated storey height of the built environment from received said altitude change data comprises determining a peak in the said distribution of received said altitude change data.

It may be that the said distribution is a frequency distribution of received said altitude change data. It may be that the frequency distribution is indicative of respective numbers of occurrences of altitude changes within each of a plurality of (typically discrete) ranges. It may be that the method comprises determining the said frequency distribution by grouping received said altitude change data into a plurality of ranges and determining the numbers of occurrences of altitude changes within each said range. It may be that the said peak in the said distribution is the peak range from the said plurality of ranges, the said peak range having the highest number of occurrences of altitude changes of the said plurality of ranges. It may be that the determined parameter relating to the estimated storey height is a parameter relating to an average (e.g. mean) altitude change of the altitude changes within the said peak range (or a parameter from which an average (e.g. mean) altitude change of the altitude changes within the peak range can be determined). It may be that the determined parameter relating to the estimated storey height is a mean (e.g. a mean altitude change) of an accumulative mean cluster comprising altitude change data, or data derived therefrom, relating to (e.g. representing) altitude changes within the said peak range.

It may be that the received said altitude change data from which the said parameter relating to the estimated storey height of the built environment is determined is a subset of received said altitude change data, the said subset relating to altitude changes within the built environment of the said mobile devices having a magnitude lower than a predetermined threshold or within a predetermined range. In some circumstances (e.g. when floor changes across multiple floors are common in a particular built environment), this can improve the accuracy of the determined parameter relating to the estimated storey height of the built environment.

The method typically comprises storing the said data relating to (e.g. representing) the vertical structure of the built environment (typically in a computer memory). The computer processing apparatus typically further comprises a memory. The computer processing apparatus is typically configured to store the said data relating to the vertical structure of the built environment in the said memory.

It may be that any one or more or each of the steps (unless otherwise specified) of the first aspect of the invention are performed by one or more server computers each comprising one or more server computer processors. Typically the computing system of the second aspect of the invention comprises one or more server computers each comprising one or more server computer processors, the said one or more server computers being configured to perform any one or more or each of the steps (unless otherwise specified) of the method performed by the said computer system. By performing these steps on one or more server computers, the quantity of processing required on the mobile devices is minimised.

Typically the said server computer(s) is/are configured to receive the said altitude change data from the said mobile devices.

Typically the computer processing apparatus is part of a (typically networked) computer system according to a third aspect of the invention, the computer system comprising the said computer processing apparatus of the second aspect of the invention and the said plurality of mobile devices which are configured to communicate data (e.g. data representing a change in altitude within the built environment of the respective mobile device or from which changes in altitude within the built environment of the respective mobile device can be determined) to (and typically receive data (e.g. data relating to the vertical structure of the built environment or data identifying a floor on which the mobile device is located) from) the said computer processing apparatus.

The step of processing received said altitude change data and (e.g. together with) the said determined parameter relating to the estimated storey height of the built environment to thereby generate data relating to the vertical structure of the built environment may comprise: determining respective numbers of floors transitioned by the said mobile devices by comparing received said altitude change data or data derived therefrom to the determined parameter relating to the estimated storey height of the built environment. The said step may further comprise generating said data relating to the vertical structure of the built environment in dependence on the determined numbers of floors transitioned.

It may be that the said altitude change data represents (e.g. quantified) magnitudes of changes in altitude within the built environment of the said mobile devices; alternatively it may be that the method comprises determining magnitudes of changes in altitudes of the said mobile devices within the built environment from the said altitude change data.

It may be that the said altitude change data indicates whether the changes of altitude of the said mobile devices within the built environment are positive altitude changes (i.e. the respective mobile devices are ascending within the built environment) or negative altitude changes (i.e. the respective mobile devices are descending within the built environment).

It may be that the said altitude change data comprises respective (typically digital) air pressure data from air pressure sensors of one or more or each of the said mobile devices or data derived therefrom. It may be that the method comprises (e.g. the said one or more server computers or the said one or more mobile devices respectively) deriving (e.g. quantified) altitude changes of the said one or more or each of the mobile devices from air pressure data measured by air pressure sensors of one or more or each of the said mobile devices. Particularly in the event that the said mobile devices derive the said altitude changes from the air pressure data, the method may further comprise transmitting the said altitude changes (e.g. by the respective one or more mobile devices to a or the server computer).

It may be that the method comprises determining (e.g. from received said altitude change data from which changes in altitude within the built environment of a plurality of mobile devices can be determined) changes in altitude within the built environment of one or more or each of the said mobile devices responsive to determinations (e.g. from the said altitude change data) that the said mobile devices have started to change altitude. It may be that the method comprises determining (e.g. from received said altitude change data from which changes in altitude within the built environment of a plurality of mobile devices can be determined) changes in altitude within the built environment of one or more or each of the said mobile devices responsive to determinations that magnitudes of rates of change of ambient air pressure measured by the said air pressure sensors (which data is typically comprised in the said altitude change data from which changes in altitude within the built environment of a plurality of mobile devices can be determined) of the respective said mobile devices exceed a threshold. It may be that the method comprises determining (e.g. from received said altitude change data from which changes in altitude within the built environment of a plurality of mobile devices can be determined) changes in altitude within the built environment of one or more or each of the said mobile devices responsive to determinations (e.g. from the said data) that the said mobile devices have started to change altitude and subsequently stopped changing altitude. It may be that the method comprises determining (e.g. from received said altitude change data from which changes in altitude within the built environment of a plurality of mobile devices can be determined) changes in altitude within the built environment of each of one or more or each of the said mobile devices responsive to determinations (e.g. from the said data) that the magnitude of the rate of change of a parameter relating to the ambient air pressure measured by the said air pressure sensor of the said mobile device exceeds a threshold during a respective first predetermined time window and that the magnitude of the rate of change of the said parameter relating to the ambient air pressure measured by the said air pressure sensor of the said mobile device falls below a (e.g. the said) threshold during a respective second predetermined time window subsequent to (and typically consecutive with) the respective first predetermined time window.

It may be that the method comprises determining the said parameter relating to the estimated storey height of the built environment from received said altitude change data relating to determined altitude changes of the said mobile devices.

It may be that the method comprises processing received said altitude change data relating to determined altitude changes of the said mobile devices and the said parameter relating to the estimated storey height of the built environment to thereby generate data relating to the vertical structure of the built environment.

It may be that the method comprises (e.g. the one or more server computers or the said respective mobile devices) filtering (e.g. low pass or Kalman filtering) the said air pressure data from the said air pressure sensors (typically to thereby smooth the air pressure data). This filtering step helps to remove erroneous discrete instantaneous changes in the measured air pressure data which can distort the output. It may be that the method comprises (e.g. the said one or more server computers or the said one or more mobile devices respectively) determining (e.g. quantified) altitude changes of the said one or more or each of the mobile devices from the filtered air pressure data.

It may be that method comprises detecting and removing outlier air pressure data from the said measured (or filtered measured) air pressure data. This can help to remove erroneous outlier air pressure data provided by the said air pressure sensors. It may be that the method comprises (e.g. the said one or more server computers or the said one or more mobile devices respectively) determining (e.g. quantified) altitude changes of the said one or more or each of the mobile devices from the (e.g. filtered) air pressure data after the outlier air pressure data has been removed.

It may be that the changes in altitude of the said mobile devices are changes in altitude between respective origin floors of the mobile devices within the built environment and respective destination floors of the mobile devices within the built environment. It may be that the method further comprises receiving or obtaining (e.g. from one or more or each of the said mobile devices) absolute floor estimation data identifying estimated (e.g. absolute) origin or destination floors of one or more of the said mobile devices or from which absolute estimations of the said origin and/or destination floors of one or more of the respective mobile devices can be determined. It may be that the method comprises processing the absolute floor estimation data (typically in dependence on received said altitude change data and/or the said determined parameter relating to the estimated storey height of the built environment) to estimate or correct an estimate of the (e.g. absolute) origin and/or destination floor of one or more of the said mobile devices (e.g. to thereby generate said data relating to the vertical structure of the built environment). It may be that the method comprises processing the absolute floor estimation data (typically in dependence on received said altitude change data and/or on the said determined parameter relating to the estimated storey height of the built environment) to generate data relating to the vertical structure of the built environment. Thus, as well as relative floor change information, absolute estimates of the floors of the built environment on which the said mobile devices are or were located can be determined.

An absolute estimate of the floor of the built environment may be an estimate of the floor of the built environment which is identified in the context of where the floor fits into the vertical structure of the built environment as a whole, rather than (for example) merely relative to another floor of the built environment without context of the vertical structure of the built environment as a whole.

Typically the absolute floor estimation data comprises absolute floor estimation data specific to a said change in altitude (e.g. a said floor change) of a said mobile device.

Typically the absolute floor estimation data comprises absolute floor estimation data specific to each said change in altitude (e.g. each said floor change) of the plurality of mobile devices.

It may be that the absolute floor estimation data comprises GNSS (Global Navigation Satellite System) data, such as GPS (Global Positioning System), GLONASS, Galileo or Compass data. For example, the GNSS data may comprise (e.g. two dimensional) locations of one or more of the said mobile devices determined by a GNSS system. Additionally or alternatively the GNSS data may comprise (e.g. location specific, e.g. mobile device specific) GNSS quality data. Typically the GNSS quality data is indicative of a quality or a potential quality (i.e. a quality if a GNSS based location estimate were to be performed) of a GNSS based location estimate of a said mobile device (e.g. a parameter relating to or derived from signal strengths of GNSS signals received by the said mobile device from one or more GNSS satellites or a parameter relating to a spatial distribution of GNSS satellites detected by the said mobile device). It may be that the GNSS data comprises link quality data indicative of (e.g. varying) link qualities of respective wireless communications links between one or more GNSS satellites and the said mobile device.

It may be that the absolute floor estimation data comprises location data comprising one or more estimated (e.g. two dimensional) locations of each of one or more of the said mobile devices, e.g. comprising a (e.g. two dimensional) location indicative of an entrance at which the said mobile device entered its origin floor (and typically the built environment, e.g. through a built environment entrance) and/or comprising a (e.g. two dimensional) location of an exit at which a said mobile device exited its destination floor (and typically the built environment, e.g. through a built environment exit).

It may be that the method comprises making an absolute (or correcting an) estimate of the origin and/or destination floors of a said mobile device performing a floor change within the built environment in dependence on received absolute floor estimation data (e.g. absolute floor estimation data specific to said mobile device).

It may be that the method comprises making an absolute (or correcting an) estimate of the origin and/or destination floors of a said mobile device performing a floor change within the built environment dependent on GNSS data specific to the said mobile device. It may be that the said GNSS data comprises a (e.g. two dimensional) location measured by a GNSS positioning module of the mobile device, e.g. a (e.g. two dimensional) location of an entrance at which the said mobile device entered its origin floor (and typically the built environment, e.g. through a built environment entrance) or of an exit at which a said mobile device exited its destination floor (and typically the built environment, e.g. through a built environment exit).

It may be that the method comprises (e.g. determining and/or receiving and/or obtaining) one or more locations of one or more of the said mobile devices indicative of an entrance location at which a said mobile device entered its origin floor (and typically the built environment) or of an exit location at which a said mobile device exited its destination floor (and typically the built environment) and) comparing locations indicative of an (e.g. the) entrance location and/or exit location of the device (e.g. to or from the built environment, e.g. the locations may be determined from the location data or GNSS data) to location specific geographical descriptive data (e.g. floor plan and/or layout and/or building boundary and/or built environment boundary and/or mapping data) relating to the said built environment (e.g. floor plan and/or layout and/or building boundary and/or built environment boundary and/or mapping data which identifies the floor on which the said built environment entrance is provided and/or data which identifies the floor on which the said built environment exit is provided and/or (e.g. floor plan and/or layout and/or building boundary and/or built environment boundary and/or mapping) data from which the floor on which the said built environment entrance/or exit is provided can be determined) to thereby make the said absolute estimate of the origin and/or destination floor of the said device. This helps to accurately determine the origin and/or destination floor of the mobile device, which in turn helps to generate accurate, more specific data relating to the vertical structure of the built environment (which can subsequently be used to identify the floor on which a mobile device is located).

It may be that the GNSS data comprises GNSS quality data specific to a said mobile device. It may be that the method comprises determining from the said GNSS quality data that the said mobile device has transitioned between indoors (e.g. the ground floor of the built environment) and outdoors. It may be that the method comprises determining from the said GNSS quality data that the said mobile device transitioned between the ground floor of the said built environment and outdoors. Thus, it may be that the method comprises determining from the said GNSS quality data that the origin or destination floor of the mobile device as being the ground floor of the built environment.

It may be that the method comprises determining a change in GNSS quality data (e.g. a change in a GNSS quality measure) specific to a said mobile device and determining therefrom that the mobile device has transitioned between indoors (e.g. the ground floor of the said built environment) and outdoors. It may be that the method comprises: determining from the said GNSS data a reduction in GNSS quality (e.g. a GNSS quality measure which does not meet one or more quality criteria) specific to the said mobile device at an entrance location (e.g. of an entrance of the built environment) of the origin floor and/or determining from the GNSS data an increase in GNSS quality (e.g. a GNSS quality measure which meets one or more quality criteria) specific to the said mobile device at an exit location (e.g. of an exit of the built environment) of the destination floor. It may be that the method further comprises, responsive to a said determination of reduction in GNSS quality, determining that the origin floor of the said mobile device is the ground floor of the built environment and/or responsive to a said determination of the said increase in GNSS quality determining that the destination floor of the said mobile device is the ground floor of the built environment. This approach allows the origin or destination floor of the mobile device to be determined even when no location specific geographical descriptive data is available for the built environment.

It may be that the method comprises determining and/or receiving and/or obtaining a location of a said mobile device (e.g. from the location data or GNSS data) at which the (e.g. said change in) GNSS quality data (e.g. the said change in the said GNSS quality measure) specific to the said device was determined and comparing the said determined location to location specific geographical descriptive data (e.g. floor plan and/or layout and/or building boundary and/or built environment boundary and/or mapping data) relating to the said built environment to thereby validate or invalidate the said determination (e.g. from said GNSS quality data) that the said mobile device has transitioned between indoors (e.g. the ground floor of the built environment) and outdoors. Typically the said location specific geographical descriptive data comprises building boundary describing a boundary of a building of the built environment or and/or built environment boundary data describing a boundary of the built environment. It may be that the method comprises determining from the said comparison of the said location to the said location specific geographical descriptive data that a transition between inside and outside the building (or built environment) boundary has taken place and, responsive to said determination, validating the said determination (e.g. from said GNSS quality data) that the said mobile device has transitioned between indoors (e.g. the ground floor of the built environment) and outdoors. The method may comprise taking into account the said validation or invalidation when generating the data relating to the vertical structure of the built environment.

It may be that the method comprises determining that a said mobile device has transitioned between indoors and outdoors.

It may be that the absolute floor estimation data comprises ambient air pressure measurements by respective air pressure sensors of the said mobile devices, said air pressure measurements being consistent with a transition between indoors and outdoors (which may in turn be an indication that the mobile device has entered or exited the built environment at the ground floor). It may be that the method comprises determining from the said ambient air pressure measurements by a said mobile device that the said mobile device has transitioned between indoors and outdoors, said ambient air pressure measurements indicating a transition between indoors and outdoors.

It may be that the method comprises determining and/or receiving and/or obtaining a location of a said mobile device at which it has been determined that the mobile device transitioned between indoors and outdoors ((e.g. from the location data or GNSS data) at which the (e.g. said change in) GNSS quality (e.g. the said change in the said GNSS quality measure) was determined or at which the said ambient air pressure measurements by the said mobile device indicated a transition between indoors and outdoors) and comparing the said determined location to location specific geographical descriptive data (e.g. floor plan and/or layout and/or building boundary and/or built environment boundary and/or mapping data) relating to the said built environment to thereby validate or invalidate the said determination (e.g. from said GNSS quality data or from the said air pressure measurements) that the said mobile device has transitioned between indoors (e.g. the ground floor of the built environment) and outdoors.

It may be that the method comprises determining and/or receiving and/or obtaining a location of a said mobile device at which it has been determined the mobile device transitioned between indoors and outdoors ((e.g. from the location data or GNSS data) at which the (e.g. said change in) GNSS quality (e.g. the said change in the said GNSS quality measure) was determined or at which the said ambient air pressure measurements by the said mobile device indicated a transition between indoors and outdoors) and determining that the built environment has an entrance or exit (e.g. through which the mobile device can transition between indoors and outdoors) at the said location. It may be that the method comprises storing the (e.g. two dimensional) location of the determined entrance or exit. It may be that the method comprises comparing a (e.g. two dimensional) location of the mobile device to the said stored location of the determined entrance or exit to determine whether (or a validate a determination that) the mobile device has transitioned between indoors and outdoors (e.g. at that location).

Typically the method comprises receiving (e.g. from the said mobile devices) signal source data relating to electromagnetic signals detected by one or more said mobile devices (e.g. from one or more (typically terrestrial) electromagnetic signal sources). It may be that the absolute floor estimation data comprises signal source data relating to electromagnetic signals detected by one or more said mobile devices from one or more (typically terrestrial) electromagnetic signal sources. It may be that the signal source data relates to electromagnetic signals detected by one or more said mobile devices from one or more (typically terrestrial) electromagnetic signal sources (e.g. Wi-Fi access points or Bluetooth beacons) at their respective origin or destination floors or at respective floor landings of the origin or destination floors (e.g. such that a quality measure (e.g. received signal strength) of the wireless link between the respective mobile device and the respective electromagnetic signal source meets one or more quality criteria (e.g. the strength of the signal received from the electromagnetic signal source by the mobile device is above a predetermined threshold)).

It may be that the method comprises receiving signal source data relating to electromagnetic signals detected by one or more said mobile devices from one or more (typically terrestrial) electromagnetic signal sources (e.g. Wi-Fi access points or Bluetooth beacons) (e.g. such that a quality measure (e.g. received signal strength) of the wireless link between the respective mobile device and the respective electromagnetic signal source meets one or more quality criteria (e.g. the strength of the signal received from the electromagnetic signal source by the mobile device is above a predetermined threshold)) at a said determined entrance or exit (e.g. through which the mobile device can transition between indoors and outdoors) of the built environment at which it has been determined the said mobile device transitioned between indoors and outdoors.

The signal source data may comprise data related to or derived from electromagnetic signals received by one or more said mobile devices from the said electromagnetic signal sources at their respective origin or destination floors (or on floor landings (e.g. adjacent to one or more floor change portals, such as staircases, elevators or escalators) of their respective origin or destination floors), or at the said determined entrance or exit. For example, the signal source data may comprise received signal strengths of electromagnetic signals received by one or more said mobile devices from respective electromagnetic signal sources at their respective origin or destination floors (or on floor landings (e.g. adjacent to one or more floor change portals, such as staircases, elevators or escalators) of their respective origin or destination floors), or at the said determined entrance or exit. The signal source data may comprise timing data relating to the timing of electromagnetic signals received by one or more said mobile devices from respective electromagnetic signal sources (e.g. the times of flight of received signals from the respective electromagnetic signal sources by the respective mobile device) at their respective origin or destination floors (or on floor landings (e.g. adjacent to one or more floor change portals, such as staircases, elevators or escalators) of their respective origin or destination floors), or at the said determined entrance or exit. The signal source data may comprise angle of arrival data relating to electromagnetic signals received by one or more said mobile devices from respective electromagnetic signal sources (e.g. the angles or directions of arrival of signals received by the said mobile devices from the respective electromagnetic signal sources) at their respective origin or destination floors (or on floor landings (e.g. adjacent to one or more floor change portals, such as staircases, elevators or escalators) of their respective origin or destination floors), or at the said determined entrance or exit. It may be that the signal source data comprises identifiers of electromagnetic signal sources detected by one or more said mobile devices on their respective origin or destination floors (or on floor landings (e.g. adjacent to one or more floor change portals, such as staircases, elevators or escalators) of their respective origin or destination floors), or at the said determined entrance or exit.

It may be that the signal source data contains respective indicators as to whether the said one or more electromagnetic signals were detected by the respective said mobile devices at their respective origin floors or at their destination floors (or on floor landings (e.g. adjacent to one or more floor change portals, such as staircases, elevators or escalators) of their respective origin or destination floors), or at the said determined entrance or exit.

It may be that the method comprises deriving respective signal source profiles for each of one or more (or each of the) floors of the built environment (or for one or more floor landings (e.g. adjacent to one or more floor change portals, such as staircases, elevators or escalators) of one or more floors of the built environment) from said signal source data received from one or more of the said mobile devices (said signal source data being related to electromagnetic signals detected by the said mobile devices from one or more electromagnetic signal sources at the said floor (or floor landing)). Each said signal source profile is typically associated with a respective floor or floor landing of the built environment (or with a respective floor landing (e.g. adjacent to one or more floor change portals, such as staircases, elevators or escalators) of a said floor of the built environment).

It may be that the method comprises deriving respective signal source profiles for each of one or more (or each of the) determined entrances and/or exits of the built environment from said signal source data received from one or more of the said mobile devices (said signal source data being related to electromagnetic signals detected by the said mobile devices from one or more electromagnetic signal sources at the said determined entrance or exit).

Typically the step of deriving the respective signal source profiles comprises processing the said signal source data (typically in dependence on received said altitude change data and/or the said determined parameter relating to the estimated storey height of the built environment) to thereby generate the signal profiles. It may be that the step of deriving the respective signal source profiles comprises correlating signal source data detected by each of a plurality of said mobile devices to thereby identify signal source data in common between them. It may be that the step of deriving the respective signal source profiles comprises correlating candidate signal source profiles to thereby identify candidate signal source profiles relating to the same floor or floor landing or determined entrance or exit. It may be that the step of deriving the respective signal source profiles comprises merging candidate signal source profiles determined to relate to the same floor or floor landing or determined entrance or exit or selecting a candidate signal profile and discarding one or more other candidate signal source profiles determined to relate to the same floor or floor landing or determined entrance or exit as the selected candidate signal profile.

Typically the said data relating to the vertical structure of the built environment comprises the said signal source profiles, each of the signal source profiles being associated with a respective floor of the built environment (or with a floor landing (e.g. adjacent to one or more floor change portals, such as staircases, elevators or escalators) of a respective floor of the built environment) or with a determined entrance or exit. Providing signal source profiles for each floor provides a means for absolutely identifying each floor of the built environment (rather than merely relatively). Providing signal source profiles for each said determined entrance or exit provides a means for determining that determined entrances or exits relate to the same entrance or exit of the built environment.

Typically the data relating to the vertical structure of the built environment comprises the said signal source profiles.

It may be that the signal source profile associated with each said floor or floor landing or determined entrance or exit of the built environment comprises profile data derived from electromagnetic signals received by one or more said mobile devices at said floor (or floor landing) or determined entrance or exit from one or more (typically terrestrial) electromagnetic signal sources. It may be that the profile data of each said signal source profile comprises profile data specific to each of one or more electromagnetic signal sources (e.g. one or more electromagnetic signal sources detected by one or more said mobile devices at the floor or floor landing or determined entrance or exit with which the profile is associated).

It may be that the (e.g. profile data of the) signal source profile associated with each said floor or floor landing or determined entrance or exit of the built environment comprises identifiers of one or more electromagnetic signal sources detected by one or more said mobile devices at the said floor or floor landing or determined entrance or exit. It may be that (e.g. the profile data of) the signal source profile associated with each floor or floor landing or determined entrance or exit of the built environment comprises, for each of one or more electromagnetic signal sources, values or ranges of possible values of one or more parameters derived from electromagnetic signals received from each the said electromagnetic signal source by one or more said mobile devices at the said floor or floor landing or determined entrance or exit. It may be that the (e.g. profile data of the) signal source profile associated with each floor or floor landing or determined entrance or exit of the built environment comprises, for each of one or more electromagnetic signal sources, values or ranges of possible values of received signal strengths derived from electromagnetic signals received from the said electromagnetic signal source by one or more said mobile devices at the said floor or floor landing or determined entrance or exit. It may be that the (e.g. profile data of the) signal source profile associated with each floor or floor landing of the built environment comprises, for each of one or more electromagnetic signal sources, values or ranges of possible values of one or more timing parameters (e.g. times of flight) derived from electromagnetic signals received from the said electromagnetic signal source by one or more said mobile devices at the said floor or floor landing or determined entrance or exit. It may be that the signal source profile associated with each floor or floor landing or determined entrance or exit of the built environment comprises, for each of one or more electromagnetic signal sources, values or ranges of possible values of one or more angles of arrival parameters (e.g. angles or directions of arrival) derived from electromagnetic signals received from the said electromagnetic signal source by one or more said mobile devices at the said floor or floor landing or determined entrance or exit.

It may be that the (e.g. profile data of the) signal source profile associated with each floor or floor landing or determined entrance or exit of the built environment comprises, for each of one or more electromagnetic signal sources, expected values (e.g. averages, e.g. accumulated means, of previously determined values by one or more said mobile devices) of one or more parameters relating to or derived from electromagnetic signals received from the said electromagnetic signal source by one or more said mobile devices at the said floor or floor landing or determined entrance or exit. It may be that the (e.g. profile data of the) signal source profile associated with each said floor or floor landing of the built environment comprises, for each of one or more electromagnetic signal sources, expected signal strengths (e.g. averages, e.g. accumulated means, of previously determined signal strengths) of electromagnetic signals received from the said electromagnetic signal source by one or more said mobile devices at the said floor or floor landing or determined entrance or exit (or expected values of a parameter related to or derived from received signal strength). It may be that the (e.g. profile data of the) signal source profile associated with each said floor or floor landing or determined entrance or exit of the built environment comprises, for each of one or more electromagnetic signal sources, expected timing data, such as times of flight, (e.g. averages, e.g. accumulated means, of previously determined times of flight) of electromagnetic signals received from the said electromagnetic signal source by one or more said mobile devices at the said floor or floor landing or determined entrance or exit (or expected values of a parameter related to or derived from time of flight). It may be that the (e.g. profile data of the) signal source profile associated with each said floor or floor landing or determined entrance or exit of the built environment comprises, for each of one or more electromagnetic signal sources, expected angle of arrival data, such as angles or directions of arrival, (e.g. averages, e.g. accumulated means, of previously determined angles or directions of arrival) of electromagnetic signals received from the said electromagnetic signal source by one or more said mobile devices at the said floor or floor landing or determined entrance or exit (or expected values of a parameter related to or derived from angle of arrival).

Typically the method comprises dynamically updating the said signal source profiles.

It may be that each said signal profile comprises (typically dynamically updated) confidence parameters associated with each of the said signal sources of the signal profile. Typically the confidence parameters are indicative of a confidence level that the signal source with which it is associated is detectable by a said mobile device at that floor or floor landing or determined entrance or exit (optionally with a parameter of the received signal having a value equal to a value, or within a range of possible values, specified in the signal profile, e.g. with a received signal strength of the received signal having a value equal to a value, or within a range of possible values, specified in the signal profile and/or with a timing parameter (e.g. time of flight) of the received signal having a value equal to a value, or within range of possible values, specified in the signal profile and/or with an angle of arrival parameter (e.g. angle or direction of arrival) of the received signal having a value equal to a value, or within a range of possible values, specified in the signal profile).

Typically the method comprises improving a confidence parameter associated with a signal source of a said signal source profile of a said floor or floor landing or determined entrance or exit responsive to a determination that a said mobile device has detected the said signal source at the said floor or floor landing or determined entrance or exit (optionally with a parameter (e.g. received signal strength and/or timing parameter (e.g. time of flight) and/or angle of arrival parameter (e.g. angle or direction of arrival)) of the received signal having a value equal to a value, or within a range of possible values, specified in the signal profile).

It may be that the method comprises processing the received signal source data (typically in dependence on received said altitude change data and/or on the determined parameter relating to the estimated storey height of the built environment) to determine (and typically store in the said data relating to the vertical structure of the built environment) one or more parameters relating to estimated altitude changes between the floors of each of one or more pairs of floors of the said built environment. It may be that the method comprises storing the said parameters relating to said estimated altitude changes between the floors of each of the said pairs of floors of the said built environment.

It may be that the said built environment has a first entrance and/or exit on a first floor (which may be any floor of the built environment and not necessarily on, for example, the first floor above ground level of the built environment) of the said built environment and a second entrance and/or exit on a second floor of the built environment (which may be any floor of the built environment and not necessarily on, for example, the second floor above ground level of the built environment). It may be that the method comprises determining that both entrances/exits are entrances/exits (e.g. from (e.g. sudden) GNSS quality data transitions (e.g. improvements/reductions in GNSS quality measures) or by comparing determined locations of mobile devices with location specific geographical descriptive data describing a boundary of the built environment or from (e.g. sudden) changes in air pressure measurements by the said mobile device(s)). It may be that the method comprises determining which of the entrances/exits is used more often (by said mobile devices). It may be that the method comprises labelling as the ground floor the floor comprising the entrance/exit which is determined to be used more often.

The method may comprise inferring that the origin floor of a said mobile device is the ground floor of the built environment (e.g. responsive to an the absence of (e.g. suitably accurate) absolute floor estimation data or responsive to a determination that the device has entered the built environment (e.g. from GNSS quality data transitions, measured air pressure transitions or by comparing determined locations of mobile devices with location specific geographical descriptive data describing a boundary of the built environment)). It may be that the method comprises correcting an estimate of the origin and/or destination floor of a said mobile device responsive to (e.g. received) absolute floor estimation data.

It may be that the data relating to the vertical structure of the built environment comprises any one or more of the group comprising: an indication of the number of floors of the built environment; a determined parameter relating to an estimated storey height of the built environment; one or more determined parameters relating to estimated altitude changes between the floors of each of one or more pairs of floors (e.g. each pair of floors or each adjacent pair of floors) of the built environment; signal source profiles for each of one or more (or each of the) floors or floor landings of the built environment.

It may be that the altitude change data comprises (e.g. three axis, e.g. vertical or horizontal) accelerometer data from (and typically measured by respective (typically three axis) accelerometers of) the said mobile devices (e.g. from which the said altitude changes of the said mobile devices can be verified). It may be that the method comprises determining (or the computer system may be configured to determine) altitude changes of the said mobile device dependent on (e.g. three axis, e.g. vertical or horizontal) accelerometer data received from the said mobile devices.

It may be that the received altitude change data (and typically where provided the absolute floor estimation data) is specific to a two dimensional location (e.g. a longitude/latitude co-ordinate or a locus of longitude/latitude co-ordinates) occupied by the built environment. It may be that the received altitude change data is explicitly associated with a particular location. Typically the data relating to the vertical structure of the built environment is specific to the said two dimensional location. It may be that the signal profiles are specific to the said two dimensional location.

It may be that the steps of the method are repeated (e.g. by the said computer processing system) for each of a plurality of two dimensional locations occupied by the built environment. It may be that the vertical structure of the built environment is different at different two dimensional locations within the built environment; accordingly, repeating the steps of the method at different two dimensional locations within the built environment allows such variations in the vertical structure of the built environment to be accounted for.

It may be that the data relating to the vertical structure of the built environment comprises, for each of a plurality of two dimensional locations occupied by the built environment, any one or more of the group comprising: an indication of the number of floors of the built environment; a determined parameter relating to an estimated storey height of the built environment; one or more determined parameters relating to estimated altitude changes between the floors of each of one or more pairs of floors (e.g. each pair of floors or each adjacent pair of floors) of the built environment; signal source profiles for each of one or more (or each of the) floors or floor landings of the built environment.

It may be that the data relating to the vertical structure of the built environment comprises data relating to the vertical structure of the built environment which is specific to (or associated with) a first two dimensional location occupied by the built environment. In this case, it may be that the method comprises: determining that a second two dimensional location different from the first two dimensional location is on the same floor of the built environment as the first two dimensional location; and inferring data relating to the vertical structure of the built environment at the second location from stored data relating to the vertical structure of the built environment at the first location. This helps to build up a picture of the vertical structure of the built environment at the second location quickly by effectively assuming (at least initially) that the vertical structure of the built environment is the same at the second location as at the first. This data relating to the second location can then be adapted (dynamically updated) responsive to more specific altitude change data subsequently received in respect of the second location.

It may be that the step of determining that the second location is on the same floor of the built environment as the first location comprises: receiving location data specifying the varying locations of one or more mobile devices, or data from which the varying locations of one or more mobile devices are derived; and determining that one or more said mobile devices in combination have traversed a path extending between the first and second locations. It may be that the step further comprises determining that the said one or more mobile devices did not change floors when traversing the said path extending between the said first and second locations.

It may be that the step of determining that the said one or more mobile devices did not change floors when traversing the said path comprises: receiving no altitude change data from the said mobile devices at their respective locations along the said path; or receiving altitude change data (typically from the said mobile devices) indicating that the said mobile devices did not change floors at their respective locations along the path.

Alternatively it may be that the one or more devices changed floors between the first and second locations, but it is determined (e.g. from received said altitude change data and the said parameter relating to the estimated storey height of the built environment) that the said second location is on the same floor as the said first location.

It may be that the location data comprises estimated locations of the mobile devices. Alternatively, it may be that the location data comprises data from which estimated locations of the mobile devices can be derived. It may be that the method further comprises estimating the varying locations of the said mobile devices from the said location data.

It may be that the method comprises outputting the said parameter related to the storey height of the built environment (e.g. responsive to a request from a mobile device (typically a handheld or wearable mobile telecommunications device), e.g. a said mobile device located in the said built environment).

It may be that the method comprises outputting data from the said data relating to the vertical structure of the built environment, e.g. to a (e.g. user interface of a) mobile device (e.g. responsive to a request from a mobile device (typically a handheld or wearable mobile telecommunications device), e.g. a mobile device located in the said built environment).

The method may comprise determining a floor of the built environment on which a mobile device is located using the said parameter relating to the storey height of the built environment or data from the said data relating to the vertical structure of the built environment. The method may further comprise outputting an indication of the floor on which the mobile device is located. The method may comprise performing one or both of these steps responsive to a request (e.g. from the said mobile device); alternatively the method may comprise pushing an indication of which floor the mobile device is located to the mobile device (i.e. without a said request).

The method may comprise determining (typically absolutely) an origin or destination floor of a mobile device in dependence on data relating to one or more electromagnetic signal sources detected by the mobile device to an extent dependent on their associated confidence parameters in one or more said signal profiles associated with respective floors of the built environment. This enables electromagnetic signal source data to be used to an extent dependent on its accuracy, thereby typically improving the estimate of the floor of the built environment on which the mobile device is located.

It may be that the method comprises detecting (or it may be that one or more or each of the said mobile devices are configured to detect) an altitude change of a or the mobile device within the built environment. Typically the method comprises determining (or it may be that one or more or each of the said mobile devices are configured to determine) a said altitude change of a said mobile device by an air pressure sensor (such as a barometer or altimeter) of the said mobile device measuring ambient air pressure; receiving air pressure data measured by the air pressure sensor; and (e.g. the said mobile device) determining a change in the said measured ambient air pressure. It may be that the method further comprises obtaining (or it may be that one or more or each of the said mobile devices are configured to obtain) data from the said data relating to the vertical structure of the built environment (e.g. from the one or more server computer(s)); and processing (or the said one or more or each of the said mobile devices being configured to process) the change in the said measured ambient air pressure with reference to the obtained data relating to (e.g. representing) the vertical structure of the built environment to determine the said floor change of the mobile device.

A fourth aspect of the invention provides a method of detecting a floor change (typically between an origin floor and a destination floor) of a mobile device (typically a portable mobile telecommunications device) within a (typically indoor) built environment comprising a plurality of floors, the method comprising: an air pressure sensor (such as a barometer or altimeter) of the mobile device measuring (e.g. monitoring) ambient air pressure. The method typically further comprises the mobile device changing floors within the built environment. The method typically further comprises (e.g. the mobile device) determining a change in a parameter relating to (e.g. derived from) the said ambient air pressure (caused by the change of floors of the mobile device) measured by the air pressure sensor. The method typically further comprises obtaining (e.g. from one or more server computers) data relating to (e.g. representing) the vertical structure (e.g. the vertical arrangement of floors) of the built environment. The method typically further comprises processing the determined change in the said parameter relating to the said ambient air pressure measured by the said air pressure sensor in dependence on the obtained data relating to (e.g. representing) the vertical structure of the built environment to determine the said (preferably absolute) floor change of the mobile device.

The method may further comprise outputting data relating to the said floor change of the said mobile device (e.g. identifying (preferably absolutely) the floor change of the mobile device).

A fifth aspect of the invention provides a mobile (typically telecommunications) device comprising a computer processor and an air pressure sensor (such as a barometer or altimeter) configured to measure (e.g. monitor) ambient air pressure, the mobile device being configured to: determine a change in a parameter relating to (e.g. derived from) the said ambient air pressure (caused by the mobile device changing floors) measured by the air pressure sensor. The mobile device is typically further configured to obtain (e.g. from a server computer) data relating to the vertical structure (e.g. the vertical arrangement of floors) of a built environment comprising a plurality of floors (and typically comprising the said mobile device). The mobile device is typically further configured to process the determined change in the said parameter relating to the ambient air pressure measured by the said air pressure sensor in dependence on the obtained data relating to the vertical structure of the built environment to determine a (preferably absolute) floor change (typically between an origin floor and a destination floor) of the mobile device within the said built environment.

The said parameter relating to the ambient air pressure measured by the said air pressure sensor may comprise the ambient air pressure or a parameter (e.g. altitude of the said mobile device) from which the ambient air pressure can be derived.

The mobile device may be configured to output (or the method may comprise outputting) data relating to the said floor change of the said mobile device (e.g. indicating the floor change of the mobile device).

Typically the said determined floor change of the mobile device comprises identifiers of the origin and/or destination floors of the floor change of the said mobile device, e.g. which may be output to a user interface such as a display.

It may be that the method further comprises filtering (or the mobile device may be configured to filter) the air pressure data from the said air pressure sensor and/or removing (or the mobile device being configured to remove) outlier air pressure data and determining (or the mobile device may be configured to determine) the said change in ambient air pressure from the filtered measured air pressure data (typically with outlier data removed). This is described in more detail in respect of the first to third aspects.

It may be that the method further comprises (e.g. the mobile device) transmitting (or the mobile device may be configured to transmit) measured air pressure data from the said air pressure sensor (e.g. to one or more said server computers).

It may be that the method comprises (or the mobile device may be configured to): locally storing (store) on the said mobile device measured air pressure data from the air pressure sensor of the said mobile device; and determining (determine) altitude change data from the said determined change in the said parameter relating to ambient air pressure measured by the said air pressure sensor. The method may comprise (e.g. the mobile device) transmitting (transmit) the said altitude change data (typically to one or more server computers). It may be that the altitude change data comprises a quantified altitude change of the mobile device (e.g. an altitude change in metres).

It may be that the method comprises (or the mobile device may be configured to) receiving (receive) data relating to the vertical structure of the built environment; and processing (to process) the said received data relating to the vertical structure of the built environment and (e.g. together with) the determined change in the said parameter relating to the ambient air pressure measured by the said air pressure sensor to determine a (typically absolute) floor change of the said (respective) mobile device.

It may be that the method comprises (e.g. the mobile device) determining that the mobile device has performed an altitude change responsive to a determination (e.g. from the measured air pressure data or from altitude change data derived therefrom) that the said mobile device has started to change altitude. It may be that the method comprises determining (or the mobile device may be configured to determine) that the mobile device has performed an altitude change responsive to a determination that a magnitude of a rate of change of said parameter relating to ambient air pressure measured by the said air pressure sensor of the said mobile device exceeds a threshold. It may be that the method comprises determining that the said mobile device has performed an altitude change responsive to a determination (e.g. from said parameter relating to ambient air pressure measured by the air pressure sensor) that the said mobile device has started to change altitude and subsequently stopped changing altitude. It may be that the method comprises determining (or the mobile device may be configured to determine) that the mobile device has performed an altitude change responsive to a determination that a magnitude of a rate of change of said parameter relating to the ambient air pressure measured by the said air pressure sensor of the said mobile device exceeds a threshold during a first predetermined time window and that a magnitude of a rate of change of said parameter relating to the ambient air pressure measured by the said air pressure sensor falls below a (e.g. the said) threshold during a second predetermined time window subsequent to (and typically consecutive with) the first predetermined time window.

It may be that the method comprises obtaining (or the mobile device may be configured to obtain) (e.g. from one or more server computers) data relating to the vertical structure (e.g. the vertical arrangement of floors) of the built environment and/or processing (or the mobile device may be configured to process) the determined change in the said parameter relating to the ambient air pressure measured by the said air pressure sensor in dependence on the obtained data relating to the vertical structure of the built environment to determine a (preferably absolute) floor change (typically between an origin floor and a destination floor) of the mobile device within the said built environment responsive to a determination that the mobile device has performed an altitude change.

It may be that the mobile device comprises a location sensor configured to estimate the (e.g. two dimensional, e.g. longitude and latitude) location of the mobile device.

It may be that the method comprises (or the mobile device may be configured to) determining (determine) a (e.g. two dimensional) location of the mobile device (e.g. the said location being defined by longitude and latitude co-ordinates or respective ranges of longitude and latitude co-ordinates). It may be that the method further comprises (or the mobile device may be configured to) transmitting (transmit) the said (typically varying) location of the mobile device (e.g. to the said one or more server computers). It may be that the obtained data relating to the vertical structure of the built environment is specific to the said (e.g. two dimensional) location.

It may be that the method according to the fourth aspect is repeated for each of a plurality of (e.g. two dimensional) locations of the mobile device. It may be that the mobile device of the fifth aspect of the invention is configured to perform the following steps for each of a plurality of (e.g. two dimensional) locations of the mobile device: determine a change in a parameter relating to (e.g. derived from) the said ambient air pressure (caused by the mobile device changing floors) measured by the air pressure sensor; obtain (e.g. from a server computer) data relating to the vertical structure (e.g. the vertical arrangement of floors) of a built environment comprising a plurality of floors (and typically comprising the said mobile device); and process the determined change in the said parameter relating to the ambient air pressure measured by the said air pressure sensor in dependence on the obtained data relating to the vertical structure of the built environment to determine a (preferably absolute) floor change (typically between an origin floor and a destination floor) of the mobile device within the said built environment.

It may be that, in each case, the obtained data relating to the vertical structure of the built environment is specific to the said (e.g. two dimensional) location of the said mobile device. It may be that the obtained data relating to the vertical structure of the built environment is different for a plurality of the said (e.g. two dimensional) locations.

It may be that the method comprises determining and/or detecting and/or (e.g. locally) storing absolute floor estimation data. It may be that the method comprises transmitting said absolute floor estimation data (e.g. to said one or more server computers). The absolute floor estimation data may comprise any of the absolute floor estimation data described above in respect of the first to third aspects. The absolute floor estimation data is typically specific to the said mobile device.

It may be that the method comprises making (or the mobile device is configured to make) an absolute estimate of the origin and/or destination floor of the mobile device (e.g. using any of the steps set out herein in respect of the first to third aspects).

It may be that the method comprises the mobile device determining (or the mobile device of the fifth aspect may be configured to detect) electromagnetic signal source data from (typically comprising received electromagnetic signal strengths and/or timing parameters (e.g. times of flight) of electromagnetic signals and/or angle of arrival parameters (e.g. angles or directions of arrival) of electromagnetic signals from, and typically identifiers of) electromagnetic signals detected from one or more electromagnetic signal sources at the origin floor and/or at the destination floor (or floor landing) or determined entrance or exit of the mobile device. It may be that the method comprises locally storing (or the mobile device may be configured to locally store) the electromagnetic signal source data on the mobile device, typically with reference to whether it was detected on the origin or destination floor (or floor landing) or determined entrance or exit. It may be that the method comprises transmitting (or the mobile device may be configured to transmit) the electromagnetic signal source data (e.g. to the said one or more servers).

It may be that the data relating to the vertical structure of the built environment comprises respective electromagnetic signal profiles for one or more or each floor or floor landing. It may be that the method comprises comparing, or the mobile device may be configured to compare, (e.g. said, e.g. locally stored or transmitted) electromagnetic signal source data to (e.g. profile data of) the received signal profiles to thereby determine a similarity or (e.g. closest) match between a respective signal profile and the electromagnetic signal source data. This step is typically performed in dependence on confidence parameters associated with each of the said signal sources of the signal profile (see above with respect to the first to third aspects of the invention). It may be that the method comprises estimating (or the mobile device may be configured to estimating) that the origin and/or destination floor of the mobile device is a floor or floor landing associated with a respective signal profile matching electromagnetic signal source data detected by the mobile device.

It may be that the method comprises receiving (or the mobile device may be configured to receive) data relating to (e.g. two dimensional) locations of one or more determined entrances or exits of the built environment. It may be that the method comprises comparing a (e.g. two dimensional) location of the mobile device (or the mobile device may be configured to compare a location of the said mobile device) to the said data relating to locations of one or more determined entrances or exits of the built environment to thereby determine or validate a determination that the mobile device has transitioned between indoors and outdoors. It may be that the method comprises receiving (or the mobile device may be configured to receive) electromagnetic signal profiles for one or more entrances or exits of the built environment. It may be that the method comprises comparing, or the mobile device may be configured to compare, (e.g. said, e.g. locally stored or transmitted) electromagnetic signal source data to (e.g. profile data of) the received signal profiles to thereby determine a similarity or match between a respective signal profile and the electromagnetic signal source data to thereby determine or validate a determination that the mobile device has transitioned between indoors and outdoors.

It may be that the method of the fourth aspect comprises an (e.g. three axis) accelerometer of the mobile device measuring (or the mobile device of the fifth aspect may comprise an accelerometer configured to measure) the (e.g. vertical) acceleration of the said mobile device. It may be that the method comprises determining (or the mobile device may be configured to determine) an altitude change of the said mobile device in dependence on the said accelerometer data. It may be that the method comprises transmitting (or the mobile device may be configured to transmit) the said accelerometer data (e.g. to the said one or more servers).

It may be that the method comprises (or the mobile device may be configured to) determining (determine) an absolute estimate of the origin floor and/or the destination floor using any of the methods described above in respect of the first to third aspects. It may be that the method comprises transmitting (or the mobile device may be configured to transmit) the absolute estimate of the origin floor and/or the destination floor (e.g. to a server computer). It may be that the method comprises processing (or the mobile device may be configured to process) the absolute estimate of the origin floor and/or the destination floor (and typically (e.g. together with) the data relating to the vertical structure of the built environment and/or the altitude change data) to determine a (typically absolute) floor change of the mobile device.

A sixth aspect of the invention provides a (typically non-transitory) computer readable medium comprising computer program code executable by a computing device or a computing system (typically comprising one or more computer processors) to cause the said computing device or computing system to: receive altitude change data representing changes in altitude within a built environment comprising a plurality of (typically vertically arranged) floors of a plurality of mobile devices or from which changes in altitude of a plurality of mobile devices within a built environment comprising a plurality of floors can be determined. The computer program code is typically further executable by a computing device or a computing system (typically comprising one or more computer processors) to cause the said computing device or computing system to determine a parameter relating to an estimated storey height of the built environment from received said altitude change data. The computer program code is typically further executable by a computing device or a computing system (typically comprising one or more computer processors) to cause the said computing device or computing system to process received said altitude change data and (e.g. together with) the said determined parameter relating to the estimated storey height to thereby generate (e.g. create or update) data relating to (e.g. representing) the vertical structure of the built environment.

A seventh aspect of the invention provides computer program code executable by a computing device or a computing system (typically comprising one or more computer processors) to cause the said computing device or computing system to: receive altitude change data representing changes in altitude within a built environment comprising a plurality of floors of a plurality of mobile devices or from which changes in altitude of a plurality of mobile devices within a built environment comprising a plurality of floors can be determined. The computer program code is typically further executable by a computing device or a computing system (typically comprising one or more computer processors) to cause the said computing device or computing system to determine a parameter relating to an estimated storey height of the built environment from received said altitude change data. The computer program code is typically further executable by a computing device or a computing system (typically comprising one or more computer processors) to cause the said computing device or computing system to process received said altitude change data and (e.g. together with) the said determined parameter relating to the estimated storey height to thereby generate (e.g. create or update) data relating to (e.g. representing) the vertical structure of the built environment.

An eighth aspect of the invention provides a (typically non-transitory) computer readable medium comprising computer program code executable by a computing device or a computing system (typically comprising one or more computer processors) to cause the said computing device or computing system to: receive ambient air pressure data relating to ambient air pressure measured by an air pressure sensor of a mobile device. The computer program code is typically further executable by a computing device or a computing system (typically comprising one or more computer processors) to cause the said computing device or computing system to determine from the ambient air pressure data a change in a parameter relating to the said ambient air pressure measured by the said air pressure sensor. The computer program code is typically further executable by a computing device or a computing system (typically comprising one or more computer processors) to cause the said computing device or computing system to obtain data relating to (e.g. representing) a vertical structure of a built environment comprising a plurality of (typically vertically arranged) floors. The computer program code is typically further executable by a computing device or a computing system (typically comprising one or more computer processors) to cause the said computing device or computing system to process the determined change in the said parameter relating to the ambient air pressure measured by the said air pressure sensor in dependence on the obtained data relating to (e.g. representing) the vertical structure of the built environment to determine a (typically absolute) floor change of the said mobile device.

A ninth aspect of invention provides computer program code executable by a computing device or a computing system (typically comprising one or more computer processors) to cause the said computing device or computing system to: receive ambient air pressure data relating to ambient air pressure measured by an air pressure sensor of a mobile device. The computer program code is typically further executable by a computing device or a computing system (typically comprising one or more computer processors) to cause the said computing device or computing system to determine from the ambient air pressure data a change in a parameter relating to the said ambient air pressure measured by the air pressure sensor. The computer program code is typically further executable by a computing device or a computing system (typically comprising one or more computer processors) to cause the said computing device or computing system to obtain data relating to (e.g. representing) a vertical structure of a built environment comprising a plurality of (typically vertically arranged) floors. The computer program code is typically further executable by a computing device or a computing system (typically comprising one or more computer processors) to cause the said computing device or computing system to process the determined change in the said parameter relating to the ambient air pressure measured by the air pressure sensor in dependence on the obtained data relating to (e.g. representing) the vertical structure of the built environment to determine a (typically absolute) floor change of the said mobile device.

Although various aspects and embodiments of the present invention have been described separately above, any of the aspects and features of the present invention can be used in conjunction with any other aspect, embodiment or feature where appropriate. For example apparatus features may where appropriate be interchanged with method features.

DESCRIPTION OF THE DRAWINGS

An example embodiment of the present invention will now be illustrated with reference to the following Figures in which:

FIG. 5 shows altitude changes between each floor and the ground floor stored in the server memory;

FIG. 6 shows signal source profiles of each floor; and

DETAILED DESCRIPTION OF AN EXAMPLE EMBODIMENT

Figure 1:
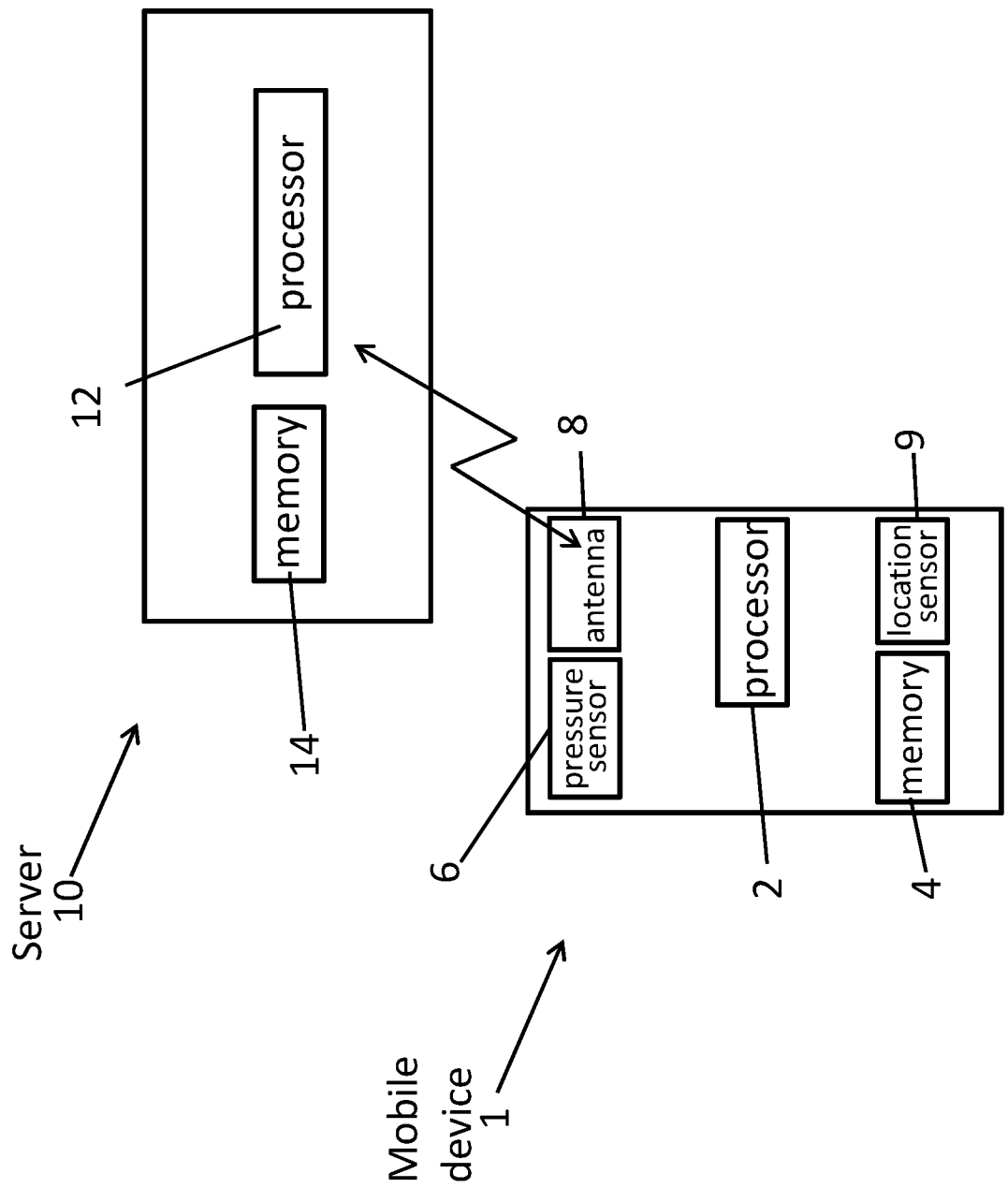
FIG. 1 is a schematic block diagram of a mobile telecommunications device in communication with a server computer.

FIG. 1 is a block diagram of a mobile telecommunications device 1 (such as a mobile smartphone, phablet, tablet, laptop, personal data assistant or wearable device such as a smartwatch) comprising a computer processor 2 (which is typically a general purpose computer processor such as a microprocessor or microcontroller), a memory 4, an air pressure sensor 6 (such as a (typically digital) barometer or altimeter) and data communication antennas 8 (one or more or each of which may be directional antennas). The data communication antennas 8 typically comprise a cellular telecommunications antenna, a Wi-Fi antenna and a Bluetooth antenna (not shown) configured to allow the mobile communications device 1 to communicate by cellular telecommunications, Wi-Fi and Bluetooth. The mobile telecommunications device 1 may further comprise an orientation sensor (such as a gyroscope or magnetometer, not shown).

The air pressure sensor 6 is configured to measure the ambient air pressure at the location of, and in the environment surrounding, the mobile device 1 and to store digital representations of measured air pressure values in memory 4. The processor 2 is configured to execute computer program instructions stored in memory 4 which cause the processor 2 to convert the measured air pressure (in millibars) values into an estimate of the absolute altitude (in metres) of the mobile device using the following relationship:

$$\text{Altitude}=0.3048*(1-(\text{measured\_air\_pressure}/1013.25)^{0.190284})*145366.45$$

Alternatively, the processor 2 may be configured to transmit air pressure values measured by the air pressure sensor 6 to a server computer 10 by way of a wireless telecommunications link 11 using one or more of the data communication antennas 8. The server computer 10 comprises a processor 12 (which is again typically a general purpose computer processor such as a microprocessor or microcontroller) and a memory 14, the processor 12 being configured to execute computer program instructions stored in the memory 14. In embodiments in which the air pressure values are transmitted to the server, it may be that the processor 12 of the server 10 is configured to execute computer program instructions causing it to calculate the absolute altitude of the mobile device 1 from the measured air pressure data using the above relationship.

The mobile device 1 further comprises a location sensor 9. The location sensor 9 comprises a Global Navigation Satellite System (GNSS) antenna configured to detect signals from GNSS satellites and a GNSS processor configured to process the signals received from the satellites to estimate the location of the mobile device 1 (alternatively processor 2 of the mobile device processes the signals from the GNSS satellites). The location sensor 9 may additionally or alternatively comprise a Wireless Positioning System (WPS) computer program application (typically comprising stored computer program instructions) configured to cause the processor 2 of the mobile device 1 (or an additional dedicated processor) to estimate a location of the mobile device 1 by processing electromagnetic signals detected by one or more of the antennas 8 from terrestrial electromagnetic signal sources of known (e.g. two dimensional) location (e.g. the two dimensional locations of electromagnetic signal sources may be stored in memory 4) and processing the received signals together with the known two dimensional locations of the electromagnetic signal sources to estimate the location of the mobile device 1, for example using triangulation or stored (e.g. in memory 4) fingerprint data specifying the expected variation of received signal strength from the said electromagnetic signal sources with distance from the signal source.

Figure 2:
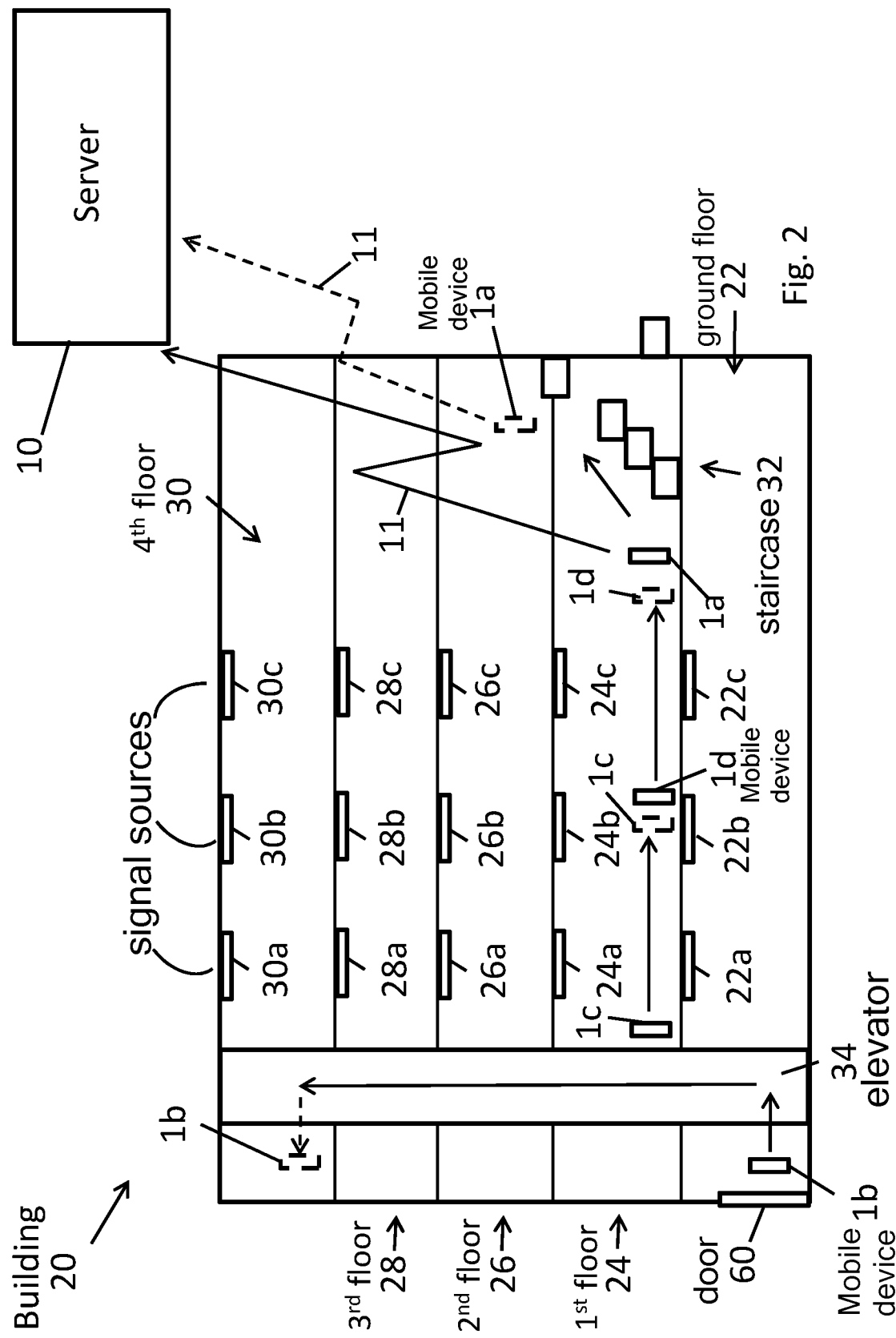
FIG. 2 is a schematic block diagram of a multi-storey building comprising five floors and housing four mobile devices and fifteen electromagnetic signal sources, the mobile devices being capable of communicating with a server.

FIG. 2 shows a multi-storey building 20 comprising five floors: a ground floor 22 at ground level; a first floor 24 immediately above the ground floor; a second floor 26 immediately above the first floor 24; a third floor 28 immediately above the second floor 26; and a fourth floor 30 immediately above the third floor 28. A staircase 32 is provided which allows people to transition between the first and second floors 24, 26. An elevator (or lift) 34 is provided which allows people to transition between any two floors 22-30 of the building 20.

Each of the floors 22-30 comprises three terrestrial electromagnetic signal sources 22*a-c*, 24*a-c*, 26*a-c*, 28*a-c*, 30*a-c* respectively. Each floor may comprise more or fewer than three signal sources (indeed different floors may have different numbers of signal sources from each other). The electromagnetic signal sources may be Wi-Fi access points or Bluetooth beacons for example. It may be that the signal sources are of known (typically two dimensional) location (typically longitude and latitude) such that signals detected by the mobile device 1 from the said electromagnetic signal sources can be used by the WPS application of the location sensor 9 to estimate its location. This may be helpful particularly if, for example, the mobile device 1 is unable to obtain a direct line of sight with GNSS satellites within the building 20 (such that it is unable to use GNSS to estimate its location).

Even if two dimensional locations of the electromagnetic signal sources 22*a-c*, 24*a-c*, 26*a-c*, 28*a-c*, 30*a-c* are known, it may be that there is no prior knowledge of the vertical structure of the building (either at the mobile device 1 or the server 10). This can make it difficult to estimate the floor of the building 20 on which the mobile device 1 is located. Even when some prior knowledge of the building 20 is available, it can be difficult to estimate the floor on which the device 1 is located directly from altitudes derived from air pressure measurements from the air pressure sensor 6 because absolute altitude measured in that way is subject to significant error, largely due to significant day to day variations in temperature and atmospheric pressure.

The inventors have realised that data describing the vertical structure of the building 20 can be generated from crowd-sourced data received from multiple mobile devices 1 transitioning between floors 22-30 of the building 20 without the need for prescribed manual surveys and without having to determine accurate absolute altitudes of the mobile devices.

Figure 3:
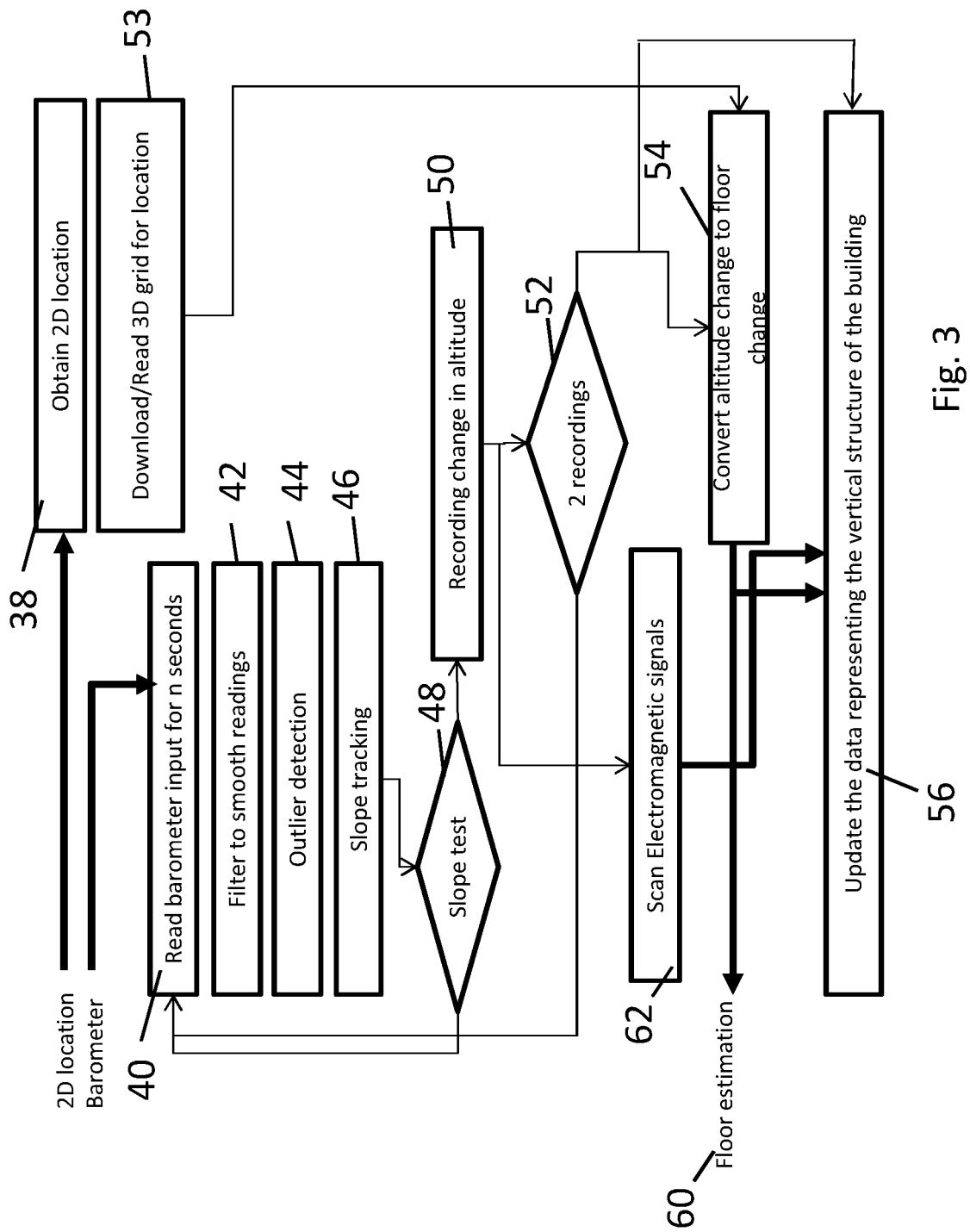
FIG. 3 is a flow chart illustrating a method of gathering altitude change data from which data relating the vertical structure of the building of FIG. 2 can be derived.
Figure 3A:
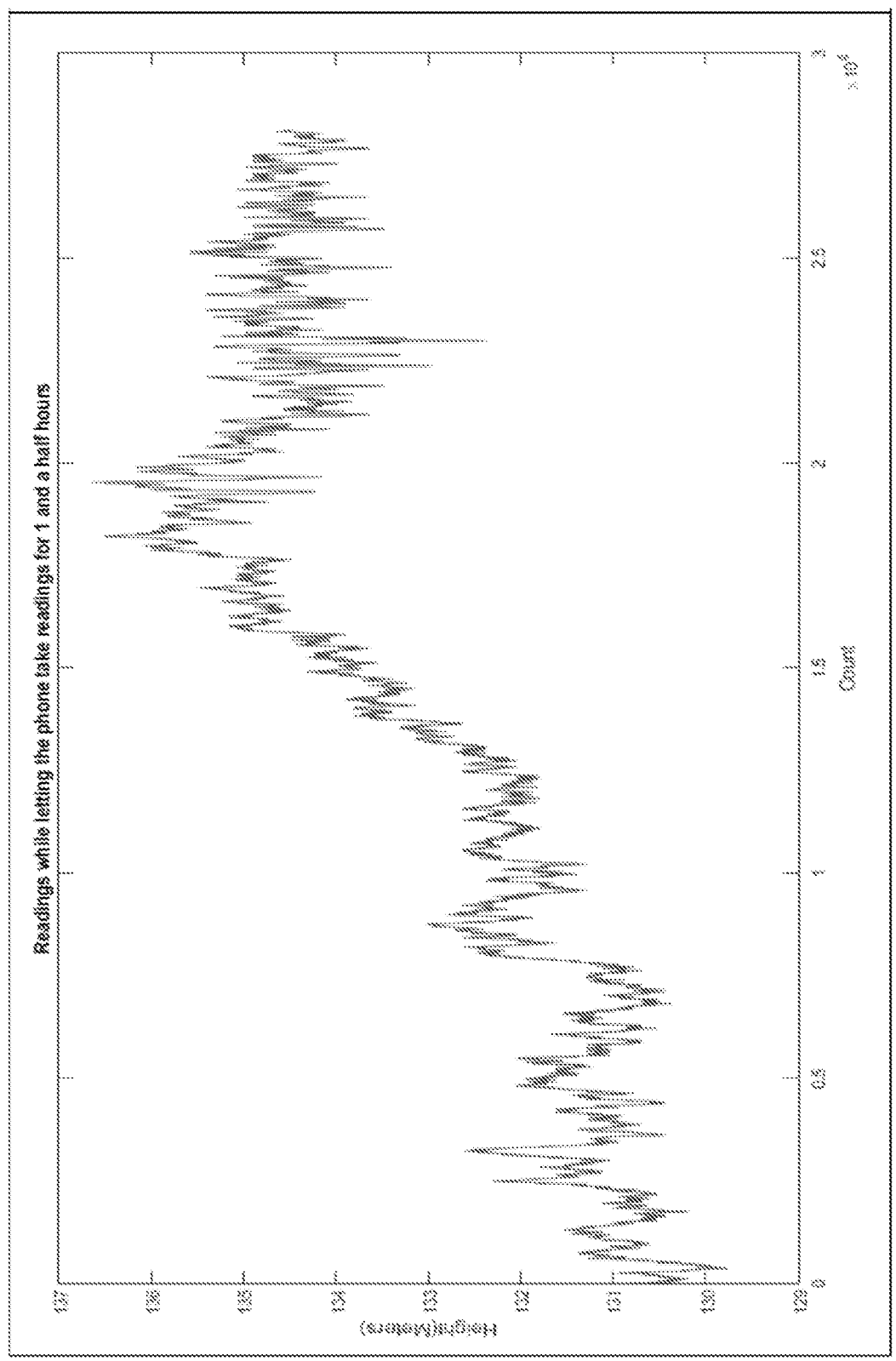
FIG. 3a is a plot of altitude data versus count, the altitude data having been derived from air pressure measurement data measured by an air pressure sensor of a mobile telecommunications device as it transitions between floors of a building.

Mobile device 1*a*, which has all of the features of the mobile device 1 described in FIG. 1 and is typically carried by a user, transitions from the first floor 22 (the origin floor) to the second floor 24 (the destination floor) in FIG. 2 by ascending the staircase 32 causing the ambient air pressure in the environment surrounding the mobile device 1 to decrease. In parallel, as shown in FIG. 3, the processor 2 of the mobile device 1*a* (or an alternative, additional processor thereof) executes stored (e.g. in memory 4) computer program instructions which cause the processor 2 to determine its two dimensional location (typically longitude and latitude) in step 38 (typically by running the WPS application) and in step 40 to sample measurements of ambient air pressure performed by its air pressure sensor 6 for a predetermined time period (e.g. 3 seconds). The sampled air pressure data is then filtered in a next step 42 (e.g. using a low pass or 1D Kalman filter) before being processed to remove outlier data. Outlier data can be detected by comparing the air pressure data to one or more models (e.g. stored in memory 4) indicative of expected changes in air pressure when a said mobile device 1*a* changes floors within the building. For example, the model(s) may specify upper limits of expected changes in magnitude of air pressure over predetermined time periods or expected ranges of changes in magnitude of air pressure between consecutive air pressure measurements. If air pressure data does not match the models (e.g. a change in magnitude of air pressure exceeds the upper limit specified in the model), then that data is discarded. Typically the outlier detection step 44 is performed after the filtering step 42 so that the outlier detection step is performed on the filtered, smoothed data (which typically improves results). If filtering and outlier detection is not performed it may be that the air pressure data (or altitude data derived from the air pressure data using the above mentioned relationship) is noisy (see FIG. 3*a* for example), which can lead to errors.

In a next step 46, a slope of the filtered air pressure data (with outlier data removed) obtained over the said predetermined time period is calculated (e.g. by subtracting the first or minimum air pressure measurement from the final or maximum air pressure measurement over the predetermined time period and dividing by the said predetermined time period) and stored in memory 4. In a next step 48 it is determined whether the magnitude of the slope exceeds a predetermined threshold 'a'. If the magnitude of the slope exceeds the threshold, the air pressure data measured in step 40, or data derived therefrom, is stored in memory 4. The fact that the slope measured is greater than the threshold 'a' is also stored by the algorithm and the method then reverts back to step 38 and steps 38 to 48 are repeated. If the magnitude of the slope determined in the implementation of steps 38 to 48 does not exceed the threshold, air pressure data measured in step 40 of that iteration (or data derived therefrom) is stored in memory 4 in step 50. In a next step 52 a check is performed to determine whether the magnitude of a slope of filtered air pressure data (with outlier data removed) measured during an immediately previous predetermined time period (typically determined during an immediately previous implementation of steps 38-48) was greater than the threshold 'a'. If the slope measured during the previous time period was not greater than the threshold, the algorithm reverts back to step 38 and steps 38-48 are repeated. In this case, the data stored in this implementation of step 50 can be discarded. If the slope during the previous time interval was greater than the threshold, the data stored in step 50 (and the data stored during the implementation of steps 38-48 in respect of which the magnitude of the slope was first greater than the threshold for a given altitude change) is retained and the algorithm determines that the mobile device was changing altitude within the building (by virtue of the fact that the air pressure data measured by the mobile device was changing with a slope greater than the threshold) during the previous predetermined time period but (by virtue of the fact that the air pressure data measured by the mobile device is no longer changing with a slope having a magnitude greater than the threshold) that it is no longer changing altitude within the building. That is, the algorithm determines that an altitude change has been performed by the device.

The stored air pressure measurement data or data derived therefrom in respect of each said predetermined time period may comprise all of the air pressure measurement data acquired by the device in the implementation of step 40 for that time period. More preferably, the data stored comprises the initial and final air pressure measurements of that time period, the minimum and maximum air pressure measurements of that time period or altitude estimates derived therefrom. The algorithm then determines in step 54 the altitude change of the device by comparing the data stored in respect of the time period in which the magnitude of the slope first exceeded the threshold for the said altitude change to the data stored in respect of the time period in which the magnitude of the slope subsequently fell below the threshold for that altitude change. For example, the algorithm may estimate the altitude change by comparing the initial or minimum air pressure value measured in respect of the time period in which the slope first exceeded the threshold with the final or maximum air pressure value measured in respect of the time period in which the magnitude of the slope subsequently fell below the threshold (or estimates of altitude determined therefrom). This estimate is then processed further in step 54 to determine a particular floor transition within the building 20 of the mobile device 1. This will be described in more detail later.

Figure 4:
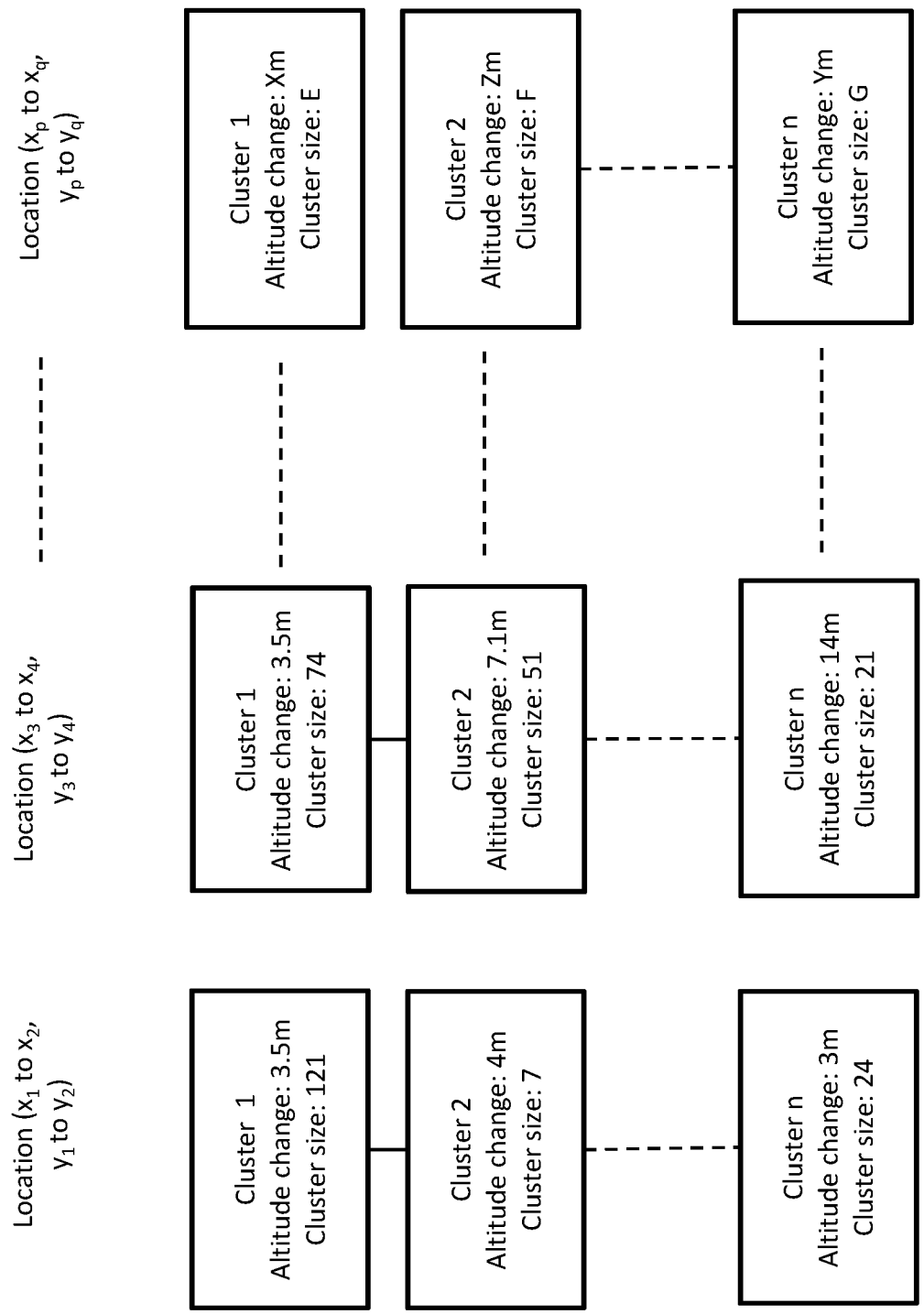
FIG. 4 shows data clusters for each of a plurality of locations, each data cluster comprising a cluster identifier, a cluster size and a cluster altitude change.

The recorded altitude changes or data from which the altitude changes can be determined (e.g. relevant air pressure measurement data) are transmitted by the mobile device 1*a* to the server 10 using one or more of the data communication antennas 8. Also transmitted to the server 10 together with (or prior or subsequent to the transmission of) the said recorded altitude changes or data from which the altitude changes can be determined is data specifying the two dimensional (longitude and latitude) location of the mobile device 1*a* at which the air pressure data from which the altitude changes were determined was recorded by the air pressure sensor 6. This location information is typically determined by the location sensor 9 of the mobile device 1*a*. In step 56, the server 10 receives the altitude change and location data from the mobile device 1*a* and uses it to generate data describing the vertical structure of the building, either by creating new data or by updating existing data. In this exemplary embodiment, the server 10 stores the received altitude change data in clusters in memory 4, the clusters being stored with reference to the two dimensional location at which the altitude change was detected. The two dimensional location may be particular longitude and latitude co-ordinates, but more typically the location is a range of longitude and latitude co-ordinates defining a (typically relatively small) two dimensional region (e.g. Location ($x_1$ to $x_x$, $y_1$ to $y_2$)). This is illustrated in FIG. 4. It may be that the location is a range of longitude and latitude co-ordinates defining a two dimensional region (e.g. a circular region having a diameter of 10 m or a square region having a length of 5 m) comprising the location at which the magnitude of the slope first started to exceed the threshold 'a' during a given altitude change and the location at which the magnitude of the slope subsequently fell below the threshold 'a'. Alternatively, the location may be a region derived from longitude and latitude co-ordinates received from a plurality of devices in a given region of the building comprising the floor transition portal (e.g. stairs, elevators) used to transition between floors in that region. Regions of different shapes may be defined for different floor transition portals (e.g. stairs, elevators).

As additional mobile devices ascend and descend the staircase 32, sending their location and altitude change data to the server 10, the processor 12 of the server 10 continues to process that data to thereby update the clusters in memory 14. If an altitude change of a mobile device is for example within a threshold range (e.g. 10%) of a recorded altitude change in an existing cluster, then it is assumed to relate to the same altitude change as that existing cluster and so the altitude change is added to the existing cluster by increasing a variable "cluster size" which records the number of times the altitude change specified by the cluster has been recorded. In addition, the altitude change value of the cluster is also updated to provide the mean altitude change of the altitude changes associated with that cluster (the cluster is an accumulative mean cluster). If an altitude change of a mobile device does not fall within the threshold range of a (typically mean) recorded altitude change in an existing cluster, a new cluster is created for that location.

In the example of FIG. 4, for location ($x_1$ to $x_2$, $y_1$ to $y_2$), n clusters are recorded in memory 14. The cluster having the largest cluster size is cluster 1. By comparing the cluster sizes of the clusters, and selecting the (typically mean) altitude change of the cluster having the largest cluster size, a peak of a frequency distribution of the detected altitude changes at that location can be determined, namely the altitude change of the cluster having the largest cluster size, in this case 3.5 m. It is then determined that the estimated storey height (i.e. the height of a single floor) of the building is 3.5 m at the location of the staircase 32. Next, the altitude changes of the remaining clusters are compared to the determined storey height of the building to determine whether any of the other clusters for that location may relate to multiple floor transitions within the building. For example, if the altitude changes of any of the remaining clusters are divisible by the storey height such that the output is greater than 2, it may be determined that that cluster relates to a floor change of two or more floors at that location. In this case, none of the clusters shown in FIG. 4 in respect of location ($x_1$ to $x_2$, $y_1$ to $y_2$) relate to multiple floor transitions. It can be inferred from this that the only detected floor change at location ($x_1$ to $x_2$, $y_1$ to $y_2$) is a single floor transition.

Referring back to FIG. 2, mobile device 1*b* (which has all of the features of mobile device 1), typically carried by a user, enters the elevator 34 on the ground floor 22 (the origin floor) and ascends in the elevator 34 to the fourth floor 30 (the destination floor). When the elevator ascends, the air pressure detected by the air pressure sensor reduces in accordance with the altitude. This is detected by the air pressure sensor 6 of the mobile device 1*b*. The altitude change of the mobile device 1*b* is determined by the mobile device 1*b* using the method described above and illustrated in FIG. 2 before being transmitted to the server 10 together with an estimate of the two dimensional location (longitude and latitude) of the device 1*b*. As above, when additional mobile devices have used the elevator 34 and transmitted their location and altitude change data to the server 10, the processor 12 of the server 10 executes computer program instructions to generate clusters in respect of the two dimensional elevator location. In this case, because the origin and destination floors of the mobile device can be any of the floors of the building when the device is transitioning between floors using the elevator 34, the clusters associated with the two dimensional location in which the elevator 34 is provided will comprise a number of clusters with altitude change values which differ significantly from each other.

The inventors have discovered that, with a typical set of clusters associated with a two dimensional location of an elevator, even when multiple clusters are provided with significantly different altitude changes, the (typically mean) altitude change of the cluster having the largest size typically corresponds to an altitude change between vertically adjacent floors (i.e. vertically neighbouring floors with no other floors in between them), i.e. the storey height of the building. In the example of FIG. 4 in respect of location ($x_3$ to $x_4$, $y_3$ to $y_4$), the cluster with the largest size is cluster 1 which has an altitude change of 3.5 m. The processor 12 of the server 10 determines from the data at location ($x_3$ to $x_4$, $y_3$ to $y_4$) that the storey height of the building is 3.5 m at that location.

In some embodiments, in order to determine the storey height of the building at the two dimensional location of a floor change portal (e.g. an elevator) which can transitioned between a plurality of pairs of floors of the building, it is advantageous to discard clusters relating to altitude changes having magnitudes exceeding a predetermined threshold or falling outside a predetermined range. In this case, for floor change portals of buildings which are commonly used to transition multiple floors for example between a ground floor and a top floor (e.g. to access a restaurant), clusters relating to such larger altitude changes can be discarded for the purpose of determining the storey height of the building. In the example of location ($x_3$ to $x_4$, $y_3$ to $y_4$), an upper limit of 7 m may be set in which case clusters 2 and n would be discarded and the determined storey height would be 3.5 m (i.e. the average (in this case mean) altitude change from a subset of the altitude change data stored for that location comprising only cluster 1).

As above, the altitude changes of the other clusters associated with location ($x_3$ to $x_4$, $y_3$ to $y_4$) can be compared to the determined storey height of the building (3.5 m) to determine whether there may be multiple floor transitions at that location. Assuming that the each floor of the building has the same height, cluster 2 in this case relates to a floor transition of two floors and cluster n relates to a transition of four floors. Accordingly the processor 12 of the server 10 infers that there are at least five floors in the building.

Although in the examples discussed above the storey height of the building, relative floor changes within the building and an estimate of the number of floors of the building can be determined from crowd-sourced altitude change data, more accurate data regarding the vertical structure of the building can be generated by determining the absolute origin or destination floors of the mobile devices performing floor transitions in the building 20. More specifically, by determining the absolute origin or destination floors of the device, absolute floor transitions can be determined (i.e. transitions between identifiable floors in a context of the building).

In one example, referring back to FIG. 2, the ground floor 22 has a door 60 through which mobile devices 1 can enter or exit the building 20. The processor 2 of the mobile device 1*b* executes computer program instructions which cause the processor 2 to monitor GNSS signal quality data from its position sensor 9 and determine significant increases or significant reductions in GNSS signal quality (such as reductions in received signal strength of signals received from one or more GNSS satellites or reductions in the spatial distribution of satellites detected by the GNSS antenna). The processor 2 of the device 1*b* infers from a significant reduction (or a continued significant reduction over one or more predetermined time periods) in GNSS signal quality that the mobile device 1*b* has moved from an outdoor environment to an indoor environment. The processor 12 of the mobile device 1*b* in turn infers that the mobile device 1*b* has entered the ground floor 22 of the building 20 (based on the assumption that the door of the building is on the ground floor 22). As discussed above, the processor 2 of the mobile device 1*b* may estimate from the air pressure data measured by the air pressure sensor 6 of the mobile device 1*b* that the mobile device 1*b* ascended 14 m in the elevator 34, which (based on the assumption that each floor of the building has a height of 3.5 m) equates to ascending four floors. The magnitude and polarity of the floor transition is transmitted to the server 10 which can thus infer that the mobile device 1 has transitioned from the ground floor 22 to a fourth floor 30; that is, the processor 12 of the server 10 can determine an absolute floor change of ground floor to fourth floor (based on the said inference that the mobile device started at the ground floor) rather than a mere relative floor change.

Additionally or alternatively, the processor 2 of the mobile device 1*b* may infer from a significant increase (or a continued significant increase over one or more predetermined time periods) in GNSS signal quality (such as increases in received signal strength of signals received from one or more GNSS satellites or increases in the spatial distribution of satellites detected by the GNSS antenna) that it has moved from an indoor environment to an outdoor environment. The processor 2 of the mobile device 1*b* in turn infers that the mobile device 1*b* has exited the building 20 at the ground floor 22 (based on the assumption that the door of the building is on the ground floor 22). The processor 2 of the mobile device 1*b* may estimate from the air pressure data measured by the air pressure sensor 6 of the mobile device 1*b* that the mobile device 1*b* descended 14 m in the elevator 34, which (based on the assumption that each floor of the building has a height of 3.5 m) equates to descending four floors. The magnitude and polarity of the floor transition is transmitted to the server 10 which can thus infer that the mobile device 1 has transitioned from the fourth floor 30 to the ground floor 22; that is, the processor 12 of the server 10 can determine an absolute floor change of fourth floor to ground floor (based on the said inference that the destination floor of the device was the ground floor) rather than a mere relative floor change.

Additionally or alternatively the processor 2 of the mobile device 1 may execute computer program instructions causing it to determine from the air pressure data measured by the air pressure sensor 6 when the mobile device 1 transitions between indoors and outdoors, for example by comparing a detected (typically sudden) air pressure change with expected air pressure changes (e.g. stored in memory 4 of the mobile device 2) when the device 1 transitions between indoors and outdoors. The processor 2 of the mobile device 1 may further infer that the device 1 is on the ground floor when such a transition occurs. The processor 2 of the mobile device 1 can thus infer that the origin or destination floor of the device 1 is the ground floor.

In some embodiments, location specific geographical descriptive data (e.g. mapping data in memory 4 or data in memory 14 of the server 10) is available which provides prior background knowledge of the location of the building 20 and/or the floors on which entrances/exits are provided and/or the locations of the entrances/exits. In this case, the floor on which a mobile device 1 enters the building can be determined or confirmed by monitoring the location estimated by the position sensor 9 of the mobile device 1 outside of the building (e.g. before entry to or after exit from the building 20), which location may be determined for example by a GNSS positioning system or by any other suitable available positioning system, determining the location of the entrance through which the mobile device 1 entered the building or the exit through which the mobile device exited the building (e.g. the location at which the air pressure change or change in GNSS quality was observed) and determining the floor on which the entrance or exit is provided in dependence on the determined location of the entrance or exit (e.g. outside of the building) and the location specific geographical descriptive data.

In some embodiments, location specific geographical descriptive data is provided (e.g. on the server memory) which comprises data describing a boundary (e.g. perimeter) of the building. In this case, it may be that the processor 2 of the mobile device 1 executes computer program instructions causing it to compare estimated locations of the said mobile device 1 to the said data describing the boundary of the building and, responsive to a determination that the mobile device transitions between inside and outside the building, validate or invalidate a determination (e.g. from the air pressure or GNSS data) that the mobile device has transitioned between indoors and outdoors.

In some embodiments, the mobile device 1 or the server 10 determines (e.g. from GNSS quality data, from air pressure change data or by comparing an estimated (typically two-dimensional) location of the mobile device 1 to location specific geographical data comprising data describing a boundary of the building) that the mobile device 1 has transitioned between indoors and outdoors and determines the location of the device 1 when it transitioned between indoors and outdoors. This location can be (e.g. transmitted to the server 10 and) stored as the location of an entrance to or exit from the building 20.

When the mobile device 1, 1a, 1b is capable of determining the origin or destination floors, or of gathering data from which the origin or destination floors can be determined, data representative of the determined origin or destination floor (or from which the determined origin or destination floor can be determined) is transmitted by the device 1, 1a, 1b to the server 10. The processor 12 of the server 10 processes this absolute floor data to generate more accurate and/or more detailed data relating to the vertical structure of the building.

In one example, altitude change data relating to particular floor changes performed by different mobile devices is correlated to determine origin and/or destination floors in common. With knowledge of the number of floors transitioned, the polarity of the transition and identifiers of the origin and/or destination floor in each case, the altitudes of individual floors from the ground floor can be estimated (rather than continuing to assume that each floor 22-30 of the building 20 is of the same height), for example by (e.g. accumulative mean) clustering altitude change data relating to floor changes directly between the ground floor 22 and each respective other floor 24-30 of the building 20 and determining the average (e.g. mean) altitude changes of the respective clusters relating to transitions between the ground floor 22 and each said respective other floor 24-30 or by summing the determined altitude changes relating to discrete floor changes between the ground floor and the respective floor. Data specifying the altitude difference from the ground floor of each respective other floor 22-30 of the building 20 is stored by the processor 12 in memory 14. This is illustrated in FIG. 5.

As well as determining the altitude change from the ground floor to each respective floor, the altitude change between each pair of floors of the building can also be determined from the altitude change data. The altitude changes between each pair of floors may be determined directly from altitude change data relating to transitions between each respective pair of floors. For example, the altitude changes between each pair of floors may be determined by (e.g. accumulative mean) clustering altitude change data relating to changes between each of a plurality of pairs of floors and determining the average (e.g. mean) altitude change of floor transitions between the floors of each pair. Alternatively altitude changes between each pair of floors may be estimated from differences in the determined relative altitudes of the respective floors from the ground floor.

The data relating to each floor may further comprise confidence parameters relating to the accuracy of the stored value of the altitude of that floor from the ground floor and/or the accuracy of the stored values of the relative altitude changes between that floor and the other respective floors of the building 20. The confidence parameters may be for example the raw number of detected floor transitions or combinations of floor transitions on which the determined altitude changes are based. Alternatively, the confidence parameters may be based on the covariance or standard deviation of the individual altitude changes or combined altitude changes on which the stored altitude changes are based.

Additionally or alternatively, absolute floor identification data can be used to correct an estimate of the origin and/or destination floor of the device (e.g. retrospectively or in real time). For example, in the absence of absolute floor identification data, it may be assumed that a mobile device originated on the ground floor of the building. It may be that the device climbs two floors and it is determined that the device is now on the second floor. Subsequently, on receipt of absolute floor identification data (e.g. data identifying the location at which the mobile device entered the building (which may be determined, as set out above, from changes in air pressure, changes in GNSS quality data or by comparing the location with location specific geographical descriptive data which describes a boundary of the building), which location may be compared and matched to location specific geographical descriptive data identifying the floor on which the entrance at that location is provided), it may be determined that the origin floor of the mobile device was not the ground floor, but that it was in fact the third floor. In this case, both the origin floor and destination floor estimates are updated accordingly (i.e. to become the third and fifth floors respectively). In another example, it may be determined that a device is on the third floor of the building (e.g. based on previous calculations using the estimated storey height of the building and determined altitude changes of the device within the building) and subsequently, responsive to absolute floor identification data (e.g. identifying that the device has exited the building on the second floor or identifying that the device is now located on the second floor (e.g. by way of absolute floor identification data comprising a signal profile—see below)), the determination of the floor of the device may be (e.g. retrospectively) corrected to the second floor. This information can be used to update, refine or correct data describing the vertical structure of the building.

In some embodiments, the raw altitude change data received from the mobile devices 1, 1a, 1b is stored even after the clusters have been formed. Accordingly, after the storey height of the building has been determined, the processor 12 of the server 10 may be configured to retrospectively process the raw stored altitude change data to determine relative and absolute floor changes of the mobile devices 1, 1a, 1b. This effectively increases the amount of crowd-sourced data available to the server 10, which increases the accuracy of the data relating to the vertical structure of the building.

When the mobile devices 1, 1a, 1b are in the building 20, their data communication antennas 8 typically detect signals from one or more electromagnetic signal sources 22a-22c, 24a-24c, 26a-26c, 28a-28c, 30a-30c on the respective floors 22-30. In preferred embodiments, the mobile devices 1, 1a, 1b store an identifier (e.g. a MAC address of a Wi-Fi access point or an identifier of a Bluetooth low energy beacon) and received signal strengths of the signals detected from the respective access points at any given time. The mobile devices 1, 1a, 1b may additionally or alternatively store timing parameters relating to timings of (e.g. times of flight of) signals received from the respective access points. The mobile devices 1, 1a, 1b may additionally or alternatively store angle of arrival parameters relating to the angles of arrival (e.g. angles of arrival or directions of arrival) of signals received from the respective access points. It may be that the data is stored locally on memory 4 of the mobile device 1 before being efficiently transmitted to the server 10. Alternatively, it may be that the electromagnetic signal source data is transmitted by the mobile device 1 to the server 10 as soon as possible after it has been detected. When the server 10 detects a floor change of the mobile device 1, 1a, 1b as described above, the processor 12 of the server 10 executes computer program instructions which cause the processor 12 to identify the electromagnetic signal source data detected by the mobile device 1 just prior to the altitude change and just after the altitude change at the determined location.

In embodiments where the absolute floor changes of the devices 1, 1a, 1b can be determined independently of the electromagnetic signal source data (as described above), the processor 12 of the server 10 may execute computer program instructions which associate the respective electromagnetic signal source data with respective absolute floors 22-30 of the building 20 on which they were detected and with the determined location. The electromagnetic signal source data detected just prior to the altitude change is associated with the origin floor of the mobile device and the electromagnetic signal source data detected just after the altitude change is associated with the destination floor of the mobile device. In this way, electromagnetic signal profiles for each floor of the building can be developed and stored, each profile storing profile data derived from signals received from one or more said (typically terrestrial) electromagnetic signal sources by one or more said mobile devices 1, 1a, 1b at the said floor (or floor landing). In the present example, each profile comprises the identifiers of, and data derived from the received signal strengths from, the electromagnetic signal sources detected (or detected with a received signal strength having a magnitude above a threshold) by any of the mobile devices at that floor (or, more specifically, at that floor at the determined location of the mobile device 1, 1a, 1b). This is illustrated in FIG. 6, the signal profile of each floor 22-30 comprising electromagnetic signal source data relating to n electromagnetic signal sources. It will be understood that, additionally or alternatively, the profiles may comprise any profile data derived from signals received from one or more said (typically terrestrial) electromagnetic signal sources by one or more said mobile devices 1, 1a, 1b at the said floor (or floor landing), such as timing data relating to timing (e.g. time of flight) of signals received by one or more of the said mobile devices 1, 1a, 1b at the said floor or floor landing and/or angle of arrival data relating to angle of arrival (e.g. angle or direction of arrival) of signals received by one or more of the said mobile devices 1, 1a, 1b at the said floor or floor landing.

In order to develop the electromagnetic signal profiles, signal source data (typically comprising identifiers of the signal sources and received signal strengths therefrom) detected by a mobile device 1, 1a, 1b just prior to the altitude change is stored and processed to create or update a signal source profile in respect of the origin floor and the signal source data (typically comprising identifiers of the signal sources and received signal strengths therefrom) detected by a mobile device 1, 1a, 1b just after the altitude change is stored and processed to create or update a signal source profile in respect of the destination floor.

As more mobile devices undergo the same altitude change and transfer electromagnetic signal source data to the server, the electromagnetic signal source data detected by those mobile devices just prior to the altitude change is used to update the stored signal source profile for the origin floor (e.g. by taking average (e.g. mean) signal strengths from each of the detected signal sources or by adding newly detected signal sources or by removing signal sources which have not been detected for a predetermined time period, by updating confidence parameters (see below) for each detected signal source and so on) and the electromagnetic signal source data detected by those mobile devices just after the altitude change is used to update the stored signal source profile for the destination floor (e.g. by taking average (e.g. mean) signal strengths from each of the detected signal sources or by adding newly detected signal sources or by removing signal sources which have not been detected for a predetermined time period, by updating confidence parameters for each detected signal source (see below) and so on).

Also stored in the electromagnetic signal source profile of each floor are respective confidence parameters each of which is associated with a respective signal source. The confidence parameters are indicative of a confidence level that the electromagnetic signal source with which it is associated would be detectable by a mobile device 1 on the respective floor at the determined location. The confidence parameters may for example comprise the number of times that signal source has been detected on the respective floor at the determined location by mobile devices 1, 1a, 1b. Alternatively more sophisticated confidence parameters may be derived using normalisation techniques (such as Gaussian regression). As another alternative, the confidence parameters may be derived from known accuracy estimates of the locations of the electromagnetic signal sources identified in the profile, which may be stored in memory 4 of the mobile device 1, 1a, 1b or in memory 14 of the server 10 for access by the position sensor 9 of the mobile device 1, 1a, 1b.

In addition or as an alternative to determining the origin or destination floors of the mobile device 1, 1a, 1b within the building independently of the electromagnetic signal source data, the electromagnetic signal source data detected by the mobile devices 1, 1a, 1b just prior to and just after their recorded altitude changes at particular locations can be correlated to determine electromagnetic signal source data in common between them at those locations. Electromagnetic signal source data detected by mobile devices 1, 1a, 1b just prior to and just after their recorded altitude changes are transferred by the mobile devices 1, 1a, 1b to the server 10 by one of the data communication antennas 8. The server 10 stores the electromagnetic signal source data it receives and processes it to generate respective electromagnetic signal profiles. The server 10 then correlates the electromagnetic signal profiles to determine which relate to the same floor, and combines signal profiles which are determined to relate to the same floor. For example, in one embodiment, the server 10 correlates electromagnetic signal profiles by calculating Euclidean distances between electromagnetic signal profiles, the Euclidean distance in each case being the square root of the sum of the square of the differences between received signal strengths for the same electromagnetic signal source (e.g. identified by MAC address) in the electromagnetic signal profiles being correlated. If the Euclidean distance is less than a predetermined threshold Euclidean distance (or if some other measure of similarity between the signal profiles is above a threshold), the server 10 combines the electromagnetic signal source profiles, typically by taking the average (e.g. mean) received signal strengths (or times of flight or angles of arrival) for signal sources in common between the profiles. Signal source profiles which are combined may then be discarded, and the combined profile retained. If a signal source profile cannot be correlated with any stored profile, it is stored as a new profile for that location. It is inferred that common signal profiles relate to the same floor 22-30 of the building 20. New signal source profiles are received by the server 10 from further mobile devices, and the new signal source profiles are correlated with the stored signal source profiles. Over time, detailed signal profiles for each floor of the building can be determined. These electromagnetic signal source profiles can thus provide a means for identifying specific individual floors within the building 20, and in particular origin and destination floors of the mobile devices 1, 1a, 1b performing floor changes within the building 20 (either in addition to other available data for determining origin or destination floors as described above or as an alternative thereto). This enables relative floor changes detected using altitude change data to be converted to absolute floor changes (either in real time or retrospectively) even when other absolute floor change data (e.g. GNSS quality data or location specific geographical descriptive data) is unavailable.

Thus, signal profiles provide a means to identify the absolute origin and/or destination floors of a mobile device, and signal source data derived from electromagnetic signals detected by the mobile device at its origin or destination floor can be provided as absolute floor identification data in order to determine an absolute floor transition of the mobile device.

In addition or as an alternative to using the electromagnetic signal source profiles as a means to identify the absolute origin and/or destination floors of a mobile device, the electromagnetic signal source profiles may also be used to validate or invalidate an altitude (or floor) change of a mobile device determined by processing the air pressure measurement data detected by the air pressure sensor 6 of the mobile device 1 as described above. More specifically, the electromagnetic signal source data detected by the mobile device can be compared with profile data from the electromagnetic signal profiles. The result of that comparison may either agree with (validate) or disagree with (invalidate) the altitude (floor) change determined by processing the air pressure measurement data detected by the air pressure sensor 6 of the mobile device 1 as described above. For example when entering or exiting the building, relatively large air pressure fluctuations can be observed which do not necessarily represent altitude or floor changes. Thus, using the signal source profiles can help to prevent false altitude change detections.

Electromagnetic signal source profiles may be determined for determined entrances or exits of the building in a similar way. Again, these electromagnetic signal source profiles are derived from electromagnetic signals received by mobile devices from one or more electromagnetic signal sources at the determined two dimensional locations of the entrance or exit. In this case, as for floors or floor landings, data relating to electromagnetic signals received by the respective mobile devices from electromagnetic signal sources at the determined entrance or exit location are transmitted by the mobile devices to the server 10 which derives the signal source profile for that determined entrance or exit. These profiles are stored and correlated with each other to determine whether a plurality of determined entrances or exits in fact relate to the same entrance or exit of the building (in the same way as different determined signal profiles for a particular floor are correlated to determine whether they relate to the same floor of the building). For example, it may be that if it is determined from their signal source profiles that a plurality of determined entrances or exits relate to the same entrance or exit of the building, it may be that the entrance or exit locations are merged (e.g. a mean location may be determined for the merged entrance or exit), typically together with their signal source profiles (e.g. a combined signal source profile may be determined for the merged entrance or exit location). This helps to determine more accurate data relating to the vertical structure of the building. The determined entrance or exit location can then be stored (e.g. by and on the server 10) as location specific geographical descriptive data which can subsequently be used to determine or validate whether a mobile device 1 has entered or exited the building at a particular location. This information as to whether the device 1 has transitioned between indoors and outdoors at a particular location can assist the determination of the origin and/or destination floor of the mobile device 1 (e.g. by inferring that the device has entered or exited the building on the ground floor at that location).

There may be more than one floor change portal (e.g. elevator, staircase) accessible from a given floor 22-30 of the building 20. Referring back to FIG. 2, on the first floor 24 there is a staircase 32 leading to the second floor 26 and an elevator 34 by way of which a user carrying a mobile device 1 can transition from the first floor 24 to any other floor of the building 20 (and indeed between any pair of floors 22-30 of the building 20). It may be that relatively complete data relating to the vertical structure of the building 20 has been generated in respect of the two dimensional location of the elevator 34, but that relatively sparse data relating to the vertical structure of the building 20 is available in respect of the two dimensional location of the staircase 32. The inventors have realised that it is possible to bridge between floor change portals on a given floor (i.e. identify that the floor change portals have landings on the same floor) and to thereby infer data relating to the vertical structure of the building at the location of one portal from the data generated relating to the vertical structure of the building in respect of the other portal. An example of this is as follows.

Referring back to FIG. 2, mobile device 1c moves from a first two dimensional location adjacent to the elevator 34 on the first floor 22 in respect of which relatively complete data relating to the vertical structure of the building is available to a second two dimensional location on the first floor 22 intermediate the elevator 34 and the staircase 32 (where the device 1c is shown in dotted lines in FIG. 2). Mobile device 1d moves from the said second location to a third two dimensional location adjacent to the staircase 32 where relatively sparse data relating to the vertical structure of the building is available. From a lack of altitude change data transmitted by mobile devices 1c, 1d to the server 10 as they move between the first and third locations, the processor 12 of the server 10 infers that no altitude changes occurred between the first and third locations. As such, the processor 12 of the server 10 also infers that the first and third locations are on the same floor of the building. The processor 12 of the server 10 then infers that the vertical structure of the building 20 at the third location is the same as that at the first location. The processor 12 of the server 10 then generates data relating to the vertical structure of the building 20 in respect of the third location using the data which has already been determined in respect of the first location (albeit the electromagnetic signal profiles at the third location will be different at the third location as compared to the first location). For example, the processor 12 of the server 10 may infer from data stored in memory 14 in respect of the first location any one or more of: the storey height of the building 20 at the third location; the number of floors of the building 20 at the third location; the altitude changes between each floor and the ground floor at the third location; and the altitude changes between each respective pair of floors at the third location (e.g. by copying respective data stored in respect of the first location). Although the inferred data may not be entirely accurate, it provides more accurate data in respect of the third location than was available previously. The processor 12 of the server 10 then iterates this data as more data is received from mobile devices 1, 1a, 1b in respect of the third location.

When the data relating to the vertical structure of the building has been generated, it can subsequently be used to determine the floor on which a particular mobile device is located in real time. Data relating to the vertical structure of the building may be provided (e.g. on the server, e.g. from which data provided to the mobile device 1 can be selected based on the location of the mobile device) for each of a plurality of two dimensional locations, and data relating to the vertical structure of the building for one two dimensional location of the said plurality of two dimensional locations may be different from data relating to the vertical structure of the building for another two dimensional location of the said plurality of two dimensional locations. This allows differences in vertical structure of a building across different two dimensional locations to be taken into account.

Referring back to FIG. 3, when the mobile device 1 has detected an altitude change indicative of a floor change, it receives data relating to the vertical structure of the building from the server 10 (either responsive to a request transmitted to the server 10 by the mobile device 1, or the data may be "pushed" to the mobile device 1 by the server 10) in step 53 (typically specific to the two dimensional location of the device 1). The processor 2 of the mobile device 1 then processes the determined altitude change data together with the data received from the server 10 to determine the absolute floor on which it is now located in step 54.

As discussed above, by step 54 the mobile device 1 has determined a relative change in its altitude from the air pressure data measured by its air pressure sensor 6. The mobile device 1 has also logged electromagnetic signal source data detected just prior to and just after the recorded altitude change. The mobile device 1 determines its origin and/or destination floors from data it has collected itself, typically in combination with data relating to the vertical structure of the building 20 obtained from the server 10. For example, by comparing the electromagnetic signal source data detected just prior to the altitude change to the signal source profiles provided by the server 10 (as part of the data relating to the vertical structure of the building), it may be possible to determine the origin floor of the mobile device 1 by determining a (e.g. closest) match to one of the signal profiles. Additionally or alternatively by comparing the signal source data detected just after the altitude change to the signal source profiles provided by the server 10, it may be possible to determine the destination floor of the mobile device 1 by determining a match to one of the signal profiles. The step of determining a match between electromagnetic signal source data detected by the mobile device 1 and the signal profiles typically comprises taking into account the confidence parameters associated with the respective signal sources in the signal profiles. That is, matches (or lack thereof) between electromagnetic signal source data and data relating to electromagnetic signal sources identified in the signal profiles are taken into account to an extent dependent on the confidence parameters (such that they are taken into account to a greater extent for confidence parameters indicating a higher level of confidence and to a lesser extent for confidence parameters indicating a lower level of confidence). Additionally or alternatively, the origin or destination floors of the mobile device 1 may be determined by comparing location data from the position sensor 9 of the mobile device with location specific geographical descriptive data (see above) or by inferring the origin or destination floors from changes in GNSS signal quality or air pressure measurements (see above).

The mobile device 1 can also determine the number of floors it has transitioned by processing the air pressure data measured by its air pressure sensor 6 to determine a relative altitude change (and its polarity) and comparing the relative altitude change with either an assumed floor height of the building (obtained from the server 10 as part of the data relating to the vertical structure of the building) or with the known heights of the respective floors of the building (obtained from the server 10 as part of the data relating to the vertical structure of the building). Thus, the mobile device 1 can determine the floor of the building on which it is now located. This can be output to the mobile device (typically to a user interface of the mobile device 1) in step 60 for example to facilitate one or location services for the user of the mobile device 1.

The step of scanning for electromagnetic signals from terrestrial electromagnetic signal sources is illustrated at step 62 of FIG. 3 after the change in altitude has been detected. This covers the detection of electromagnetic signals by the mobile device 1 from electromagnetic signal sources just after the altitude change. However, it will be understood that this step is performed regularly even when the mobile device 1 has not detected an altitude change so that it can provide electromagnetic signal source data in respect of its origin floor as well as its destination floor.

In step 56, the scanned electromagnetic signal source data (both from the origin and destination floors) is transmitted from the mobile device 1 to the server 10 together with the determined floor change of the mobile device 1 (and typically data representing the altitude change from which the floor change was determined) and the processor 12 of the server 10 executes computer program instructions to process the data to thereby dynamically update the data relating to the vertical structure of the building 20 as described above.

It will be understood that, when sufficiently detailed and accurate electromagnetic signal profiles of each floor of the building have been determined, mobile devices 1 can determine the floor on which they are located merely be comparing detected electromagnetic signal source data with the signal profiles and identifying the closest match. Thus, over time, it may no longer be necessary to process the air pressure data from the air pressure sensor 6 as described with reference to FIG. 3. However, as described above, the air pressure measurement data gathered by the mobile devices 1 enables the server 10 to generate data relating to the vertical structure of the building 20 from crowd-sourced data without having to perform expensive and time consuming prescribed manual surveys of electromagnetic signal sources.

In some cases, a building may have multiple entrances and exits some of which are on different floors. For example, a multi-storey building may have an entrance/exit on the ground floor and one on the third floor. In this case, it may be that the floors are labelled in dependence on which of the entrances/exits are used most often (which may be determined from location data received from said mobile devices). For example, it may be determined that the entrance/exit on the third floor is used more often than the entrance/exit on the ground floor. In this case, the server may be configured to label the third floor as the ground floor, and the ground floor as floor-2. Conversely if the entrance/exit on the ground floor is determined to be used more often, it may be that the server is configured to label the ground floor as the ground floor, and the third floor as the third floor.

Further modifications and variations may be made within the scope of the invention herein disclosed.

Although steps 38 to 52 and 54 of FIG. 3 are described above as being performed by the mobile device 1, it may be that some or all of these steps are performed by the server 10. For example, the mobile device 1 may transmit air pressure data measured by the air pressure sensor 6 to the server 10 which filters the data, removes outliers, performs slope tracking and detects changes in altitude of the mobile device 1 converts changes in altitude to (e.g. absolute) floor changes using the data relating to the vertical structure of the building received in step 54. Additionally or alternatively, it may be that the mobile device 1 detects electromagnetic signal data from the electromagnetic signal sources and transmits it to the server 10 for processing, for example to determine whether the signal source data relates to the origin or destination floor of the mobile device 1.

Although one server 10 is described in the above embodiments, it will be understood that a plurality of server computers may be provided. In this case, the steps performed by the server 10 may be performed by one server computer of the said plurality of server computers or they may be distributed across the said plurality of servers. Similarly, the memory 14 may be provided on one server computer or distributed among the said plurality of servers.

Although the step 56 of updating the data relating to the vertical structure of the building is described above as being performed by the server 10, it may be that some of the processing required to generate data relating to the vertical structure of the building is performed by the mobile device 1.

Although in the above embodiments, an estimated storey height of the building is determined from received altitude change data, in some embodiments it may be that a parameter relating to the estimated storey height of the building is determined, such as an air pressure change from which the estimated storey height of the building can be determined. In this example, the air pressure change relating to the estimated storey height of the building can be compared to air pressure changes contained within the altitude change data to determine a number of floors ascended or descended by the mobile device without having to convert air pressure changes to altitude changes.

Similarly, although in the above embodiments it is the slope of the measured air pressure data which is assessed to determine whether a mobile device 1 is changing floors, it may alternatively be another parameter relating to the air pressure such as the altitude of the device 1 (which may be derived from a measured air pressure).

Although in the above embodiments a multi-storey building is described, it will be understood that the various aspects of the invention described herein are equally applicable to any built environment comprising a plurality of (typically vertically arranged) floors. For example, the multi-storey building may be replaced by a built environment comprising a plurality of buildings one or more of which have a plurality of floors, the said plurality of buildings being connected to each other. The plurality of buildings may be adjacent to each other, for example, as part of a block of buildings in a metropolitan area. The plurality of buildings of the built environment may be interconnected. The plurality of buildings of the built environment may comprise one or more buildings having different numbers of floors from each other.

Figure 7:
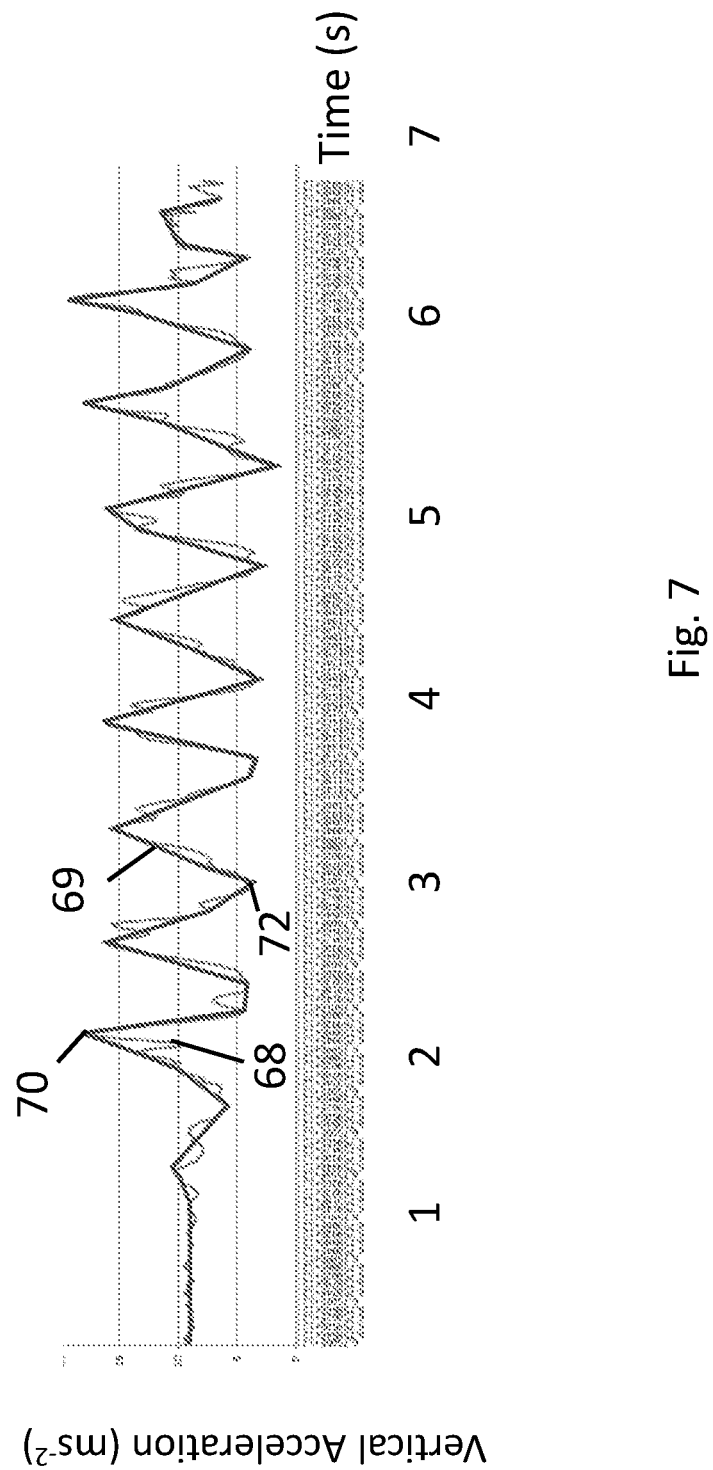
FIG. 7 shows exemplary vertical acceleration data from an accelerometer of a mobile device.

In some embodiments the mobile device 1, 1a, 1b comprises an (e.g. three-axis) accelerometer. In this case, it may be that the mobile device 1, 1a, 1b (or the server 10) is configured to use accelerometer data measured by the accelerometer of that device 1, 1a, 1b to help determine that there has been an altitude change (e.g. as part of steps 48-50 of the method of FIG. 2). FIG. 7 is a plot of vertical acceleration data versus time as measured by the accelerometer when a user carrying the mobile telecommunications device 1 walks or runs. The plot shown in FIG. 2A has eight local maxima 70 and eight local minima 72. Each transition between a local maximum 70 and a chronologically subsequent and adjacent local minimum 72 is caused by a step taken by the user. The raw vertical acceleration data measured by the accelerometer also comprises fluctuations in vertical acceleration which are not caused by steps taken by the user. In order to remove these fluctuations, the vertical acceleration data has been low pass filtered. Both the raw (68) and filtered (69) vertical acceleration data is shown in FIG. 7; the maxima and minima are derived from the low pass filtered data because the low pass filtering step makes the local maxima and minima, and therefore steps taken by the user, easier to extract from the vertical acceleration data.

It has been empirically determined that, if all of the following three conditions are met by the (preferably low pass filtered) vertical acceleration data obtained from the accelerometer during the said predetermined time periods of step 40 in FIG. 2, the user has moved vertically upwards during that time period:

$$A_{ave\_max} - A_{ave\_min} > 10$$

$$A_{ave\_min} > 4.2$$

$$A_{ave\_max} < 16.2, \text{ where}$$

$A_{ave\_max}$ is the average magnitude of local maxima of (typically low pass filtered) vertical acceleration data output by the accelerometer during the said predetermined time period; and $A_{ave\_min}$ is the average magnitude of local minima of (typically low pass filtered) vertical acceleration data output by the accelerometer during the said predetermined time period.

It has also been empirically determined that, if both of the following two conditions are met by the vertical acceleration data obtained from the accelerometer during the said predetermined time periods of step 40 in FIG. 2, the user has moved vertically downwards:

$$A_{ave\_min} < 4.2$$

$$A_{ave\_max} > 16.2$$

$A_{ave\_min}$ and $A_{ave\_max}$ may thus be averaged over the predetermined time periods to determine a vertical motion indicator over that time period. In this case, the vertical motion indicators indicate whether vertically up or vertically down movement has been performed by the user over the time period. Such indicators typically provide binary assessments as to whether the user has moved upwards (e.g. climbed a set of stairs) or downwards (e.g. descended a set of stairs), but are not typically suitable for determining vertical position accurately in isolation.

Thus, data measured by the accelerometer can be used to confirm whether the device 1 is moving upwards or downwards to validate or invalidate the air pressure data measured by the air pressure sensor 6 or (for example) to resolve a conflict between a floor change determined from air pressure data measured by the air pressure sensor 6 and an estimation of the (absolute origin and/or destination) floor of a mobile device obtained by comparing detected electromagnetic signal source data to one or more electromagnetic signal source profiles from the data relating to the vertical structure of the building.

The invention claimed is:

1. A method of generating and using data relating to a vertical structure of a built environment including a plurality of floors, the method comprising:
    receiving crowdsourced altitude change data representing changes in altitude within the built environment of a plurality of mobile devices or from which changes in altitude within the built environment of a plurality of mobile devices can be determined;
    determining a parameter relating to an estimated storey height of the built environment from received said altitude change data; and
    processing the received crowdsourced altitude change data and the determined parameter relating to the estimated storey height to thereby generate data relating to the vertical structure of the built environment;
    wherein the step of determining the parameter relating to the estimated storey height of the built environment from the received crowdsourced altitude change data includes determining the parameter relating to the estimated storey height of the built environment from a data cluster of the received crowdsourced altitude change data;
    wherein the method further comprises:
    processing the altitude change data to determine a floor change;
    deriving one or more respective electromagnetic signal source profiles for each of one or more floors, of the built environment from signal source data received from one or more of the mobile devices, the signal source data relating to electromagnetic signals detected by one or more of the mobile devices at their respective origin and/or destination floors, wherein the signal source profiles of each floor include profile data derived from electromagnetic signals received by one or more said mobile devices at said floor from one or more electromagnetic signal sources located at the origin and/or destination floor; and
    determining validation of the floor change determined by processing the altitude change data using the one or more electromagnetic signal source profiles.

2. The method of claim 1 wherein the step of determining the parameter relating to the estimated storey height of the built environment from the received crowdsourced altitude change data includes determining a peak in the data cluster of the received crowdsourced altitude change data.

3. The method of claim 1 wherein the step of determining the parameter relating to the estimated storey height of the built environment from the received crowdsourced altitude change data includes determining the parameter relating to the estimated storey height of the built environment from a subset of the received crowdsourced altitude change data, the subset relating to altitude changes within the built environment of said mobile devices having a magnitude lower than a predetermined threshold or within a predetermined range.

4. The method of claim 1 wherein the step of processing the received crowdsourced altitude change data and the determined parameter relating to the estimated storey height of the built environment to thereby generate data relating to the vertical structure of the built environment includes: determining respective numbers of floors transitioned by the mobile devices by comparing the received crowdsourced altitude change data or data derived therefrom to the determined parameter relating to the estimated storey height of the built environment; and generating said data relating to the vertical structure of the built environment in dependence on the determined numbers of floors transitioned.

5. The method according to claim 1 wherein the changes in altitude of the mobile devices are changes in altitude between respective origin floors of the mobile devices within the built environment and respective destination floors of the mobile devices within the built environment, and wherein the method further comprises: receiving absolute floor estimation data identifying estimated origin and/or destination floors of one or more of the mobile devices or from which absolute estimations of the origin and/or destination floors of one or more of the respective mobile devices can be determined; and processing the absolute floor estimation data together with the received crowdsourced altitude change data and the parameter relating to the estimated storey height of the built environment to generate data relating to the vertical structure of the multi-storey built environment.

6. The method according to claim 5 further comprising processing the absolute floor estimation data to estimate or correct an estimate of the origin and/or destination floor of one or more of the mobile devices wherein the absolute floor estimation data includes location data including one or more estimated locations of each of one or more of the mobile devices.

7. The method according to claim 6 wherein one or more of the estimated locations are indicative of an entrance location at which a said mobile device entered its origin floor or of an exit location at which a said mobile device exited its destination floor, the method further comprising comparing the locations indicative of the entrance or exit location to location specific geographical descriptive data relating to the built environment to thereby make an absolute estimate of the origin and/or destination floor of the device.

8. The method according to claim 5 wherein the absolute floor estimation data includes GNSS (Global Navigation Satellite System) data, wherein the GNSS data includes GNSS quality data specific to a said mobile device and, the method further comprising determining from the GNSS quality data that the mobile device has transitioned between indoors and outdoors and/or that the mobile device transitioned between the ground floor of the built environment and outdoors.

9. The method according to claim 8 further comprising determining or receiving a location of the mobile device at which said GNSS quality data was determined and comparing the determined location to location specific geographical descriptive data relating to the built environment to thereby validate or invalidate a said determination that the mobile device has transitioned between indoors and outdoors.

10. The method according to claim 5 wherein the absolute floor estimation data includes ambient air pressure measurements by respective air pressure sensors of the mobile devices and/or signal source data relating to the electromagnetic signals detected by one or more of the mobile devices at their respective origin or destination floors.

11. The method according to claim 5 further comprising processing the absolute floor estimation data in dependence on the received crowdsourced altitude change data and the estimated storey height of the built environment to estimate the altitude change between the floors of each of one or more pairs of floors of the built environment.

12. The method according to claim 5 wherein the data relating to the vertical structure of the built environment includes any one or more of: an indication of the number of floors of the built environment; a determined parameter relating to an estimated storey height of the built environment; one or more determined parameters relating to estimated altitude changes between the floors of each of one or more pairs of floors of the built environment; the electromagnetic source profiles for each of one or more floors or floor landings of the built environment.

13. The method according to claim 1 wherein the data relating to the vertical structure of the built environment is specific to a first two dimensional location occupied by the built environment, and wherein the method further comprises: determining that a second two dimensional location different from the first two dimensional location is on the same floor of the built environment as the first two dimensional location; and inferring data relating to the vertical structure of the built environment at the second location from stored data relating to the vertical structure of the built environment at the first location, and wherein the method further comprises determining that the second location is on the same floor of the built environment as the first location by: receiving location data specifying the varying locations of one or more mobile devices, or data from which the varying locations of one or more mobile devices are derived; and determining that one or more said mobile devices in combination have traversed a path extending between the first and second locations.

14. The method according to claim 1 further comprising: determining that a said mobile device has transitioned between indoors and outdoors; receiving and/or obtaining the location of the mobile device at which it has been determined the mobile device transitioned between indoors and outdoors; and determining that the built environment has an entrance or exit at the location, and further comprising receiving signal source data relating to electromagnetic signals which have been detected by one or more of the mobile devices at a said determined entrance or exit; and deriving respective signal source profiles for each of one or more said determined entrances and/or exits of the built environment from said signal source data received from said one or more mobile devices.

15. The method of claim 1 wherein the step of determining the parameter relating to the estimated storey height of the built environment from the received crowdsourced altitude change data includes determining an average value in the data cluster of the received crowdsourced altitude change data.

16. A computer processing apparatus comprising: a computer processor, the computer processing apparatus being configured to perform the steps including:
receiving crowdsourced altitude change data representing changes in altitude within a built environment comprising a plurality of floors of a plurality of mobile devices or from which changes in altitude of a plurality of mobile devices within a built environment including a plurality of floors can be determined;
determining a parameter relating to an estimated storey height of the built environment from the received crowdsourced altitude change data; and
processing the received crowdsourced altitude change data and the determined parameter relating to the estimated storey height to thereby generate data relating to the vertical structure of the built environment;
wherein the step of determining the parameter relating to the estimated storey height of the built environment from the received crowdsourced altitude change data includes determining the parameter relating to the estimated storey height of the built environment from a data cluster of the received crowdsourced altitude change data;
wherein the steps further include:
processing the altitude change data to determine a floor change;
deriving one or more respective electromagnetic signal source profiles for each of one or more floors of the built environment from signal source data received from one or more of the mobile devices, the signal source data relating to electromagnetic signals detected by one or more of the mobile devices at their respective origin and/or designation floors, wherein the signal source profiles of each floor include profile data derived from electromagnetic signals received by one or more said mobile devices at said floor from one or more electromagnetic signal sources located at the origin and/or destination floors; and
determining validation of the floor change determined by processing the altitude change data using the one or more electromagnetic signal source profiles.

17. The computer processing apparatus comprising of claim 16 wherein the step of determining the parameter relating to the estimated storey height of the built environment from the received crowdsourced altitude change data includes determining an average value in the data cluster of the received crowdsourced altitude change data.

18. A method of detecting a floor change of a mobile device within a built environment including a plurality of floors, the method comprising:
an air pressure sensor of the mobile device measuring ambient air pressure; the mobile device changing floors within the built environment;
determining a change in a parameter relating to the ambient air pressure measured by the air pressure sensor;
obtaining data relating to the vertical structure of the built environment;
processing the determined change in the parameter relating to the ambient air pressure measured by the air pressure sensor in dependence on the obtained data relating to the vertical structure of the built environment to determine the floor change of the mobile device; and
determining electromagnetic signal source data from electromagnetic signals from an electromagnetic signal source at the destination floor and adjacent to a floor change portal, the electromagnetic signals being detected by the mobile device at the destination floor of the mobile device;
comparing the electromagnetic signal source data to one or more signal profiles provided in the obtained data relating to the vertical structure of the built environment to thereby determine a match between a respective signal profile and the electromagnetic signal source data; and
estimating that the destination floor of the mobile device is a floor associated with the respective signal profile matching the electromagnetic signal source data.

19. The method of claim 18 further comprising making an absolute estimate of the origin and/or destination floor of the mobile device.

* * * * *